United States Patent
Kumar R C et al.

(10) Patent No.: US 11,442,957 B2
(45) Date of Patent: Sep. 13, 2022

(54) CLOUD-BASED FISCAL YEAR VARIANT CONVERSION

(71) Applicant: SAP SE, Walldorf (DE)

(72) Inventors: Naveen Kumar R C, Bangalore (IN); Sameer Singh Virdi, Bangalore (IN)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 16/691,350

(22) Filed: Nov. 21, 2019

(65) Prior Publication Data

US 2021/0064633 A1 Mar. 4, 2021

(30) Foreign Application Priority Data

Sep. 3, 2019 (IN) .............................. 201911035408

(51) Int. Cl.
| | | |
|---|---|---|
| G06F 16/00 | (2019.01) | |
| G06F 16/25 | (2019.01) | |
| G06Q 40/00 | (2012.01) | |
| H04L 9/32 | (2006.01) | |
| G06F 16/22 | (2019.01) | |
| G06Q 10/06 | (2012.01) | |

(52) U.S. Cl.
CPC ........ *G06F 16/258* (2019.01); *G06F 16/2282* (2019.01); *G06Q 10/0631* (2013.01); *G06Q 40/12* (2013.12); *H04L 9/3242* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,130,812 B1* | 10/2006 | Iyer | .................... | G06F 16/24565 |
| | | | | 705/28 |
| 7,873,675 B2* | 1/2011 | Richey | .................... | G06Q 10/06 |
| | | | | 706/45 |
| 8,165,990 B2* | 4/2012 | Val | ......................... | G06F 16/213 |
| | | | | 707/E17.005 |
| 8,417,741 B2* | 4/2013 | Watterott | ................ | H04L 67/04 |
| | | | | 707/809 |
| 10,404,787 B1* | 9/2019 | Florissi | .................... | G06F 9/541 |
| 10,496,926 B2* | 12/2019 | Florissi | .................. | G06N 5/022 |
| 10,509,684 B2* | 12/2019 | Florissi | ............... | H04L 63/0407 |

(Continued)

OTHER PUBLICATIONS

Soderberg, Alexander, and Max Aberg. "Optimizing Business Intelligence Extraction Speed from an ERP-System's Database." 1650-2884 (2015). (Year: 2015).*

(Continued)

*Primary Examiner* — Farhan M Syed
(74) *Attorney, Agent, or Firm* — Klarquist Sparkman, LLP

(57) ABSTRACT

A computer-implemented method is disclosed. In a deployed enterprise resource planning system implementing a first fiscal year variant, the method can configure a second fiscal year variant that is different from the first fiscal year variant. The method can identify a list of target tables in the deployed enterprise resource planning system that contains the first fiscal year variant. The method can convert the first fiscal year variant to the second fiscal year variant in the list of target tables. In certain embodiments, the method can replace the first fiscal year variant with the second fiscal year variant in a reference framework interfacing with the list of target tables.

20 Claims, 14 Drawing Sheets

(56) References Cited

U.S. PATENT DOCUMENTS

| | | | |
|---|---|---|---|
| 10,515,097 B2* | 12/2019 | Florissi | G06F 16/27 |
| 10,749,962 B2* | 8/2020 | Lawson | H04L 67/10 |
| 10,776,404 B2* | 9/2020 | Florissi | G06F 16/2477 |
| 10,817,505 B2* | 10/2020 | Tiwary | H04L 63/0876 |
| 10,891,297 B2* | 1/2021 | Zhu | G06F 16/248 |
| 11,048,683 B2* | 6/2021 | Ackermann | G06F 16/215 |
| 11,113,253 B2* | 9/2021 | Kruempelmann | G06F 16/211 |
| 2007/0220027 A1* | 9/2007 | Richey | G06Q 10/06 |
| 2008/0270490 A1* | 10/2008 | Watterott | H04L 67/1095 |
| 2008/0306986 A1* | 12/2008 | Doyle, Sr. | G06F 8/51 |
| | | | 717/136 |
| 2010/0318494 A1* | 12/2010 | Val | G06F 16/213 |
| | | | 707/E17.005 |
| 2013/0124465 A1* | 5/2013 | Pingel | H04L 67/12 |
| | | | 707/610 |
| 2014/0006347 A1* | 1/2014 | Qureshi | H04W 12/06 |
| | | | 707/783 |
| 2017/0004185 A1* | 1/2017 | Zhu | G06F 16/2455 |
| 2018/0047073 A1* | 2/2018 | Neumark | G06Q 40/025 |
| 2018/0089188 A1* | 3/2018 | Kharisma | G06F 16/90335 |
| 2018/0089272 A1* | 3/2018 | Bath | G06F 16/248 |
| 2018/0089286 A1* | 3/2018 | Marquardt | G06F 16/9535 |
| 2018/0089287 A1* | 3/2018 | Haggie | G06F 16/90335 |
| 2018/0095953 A1* | 4/2018 | Mayer | G06F 16/214 |
| 2018/0210880 A1* | 7/2018 | Thomas | G06F 16/214 |
| 2019/0108253 A1* | 4/2019 | Ackermann | G06F 16/2365 |
| 2019/0147084 A1* | 5/2019 | Pal | G06F 16/2471 |
| | | | 707/769 |
| 2019/0147085 A1* | 5/2019 | Pal | G06F 16/24542 |
| | | | 707/718 |
| 2019/0147086 A1* | 5/2019 | Pal | G06F 16/24545 |
| | | | 707/718 |
| 2019/0147092 A1* | 5/2019 | Pal | H04L 67/125 |
| | | | 707/713 |
| 2019/0188046 A1* | 6/2019 | Florissi | H04L 63/0209 |
| 2019/0266496 A1* | 8/2019 | Florissi | G06Q 20/065 |
| 2019/0294617 A1* | 9/2019 | Florissi | G06F 16/2477 |
| 2019/0317949 A1* | 10/2019 | Florissi | G06F 16/2471 |
| 2019/0347346 A1* | 11/2019 | Tiwary | G06F 21/6218 |
| 2020/0134057 A1* | 4/2020 | Kruempelmann | G06F 16/25 |
| 2021/0056095 A1* | 2/2021 | Srivastava | G06F 16/2455 |

OTHER PUBLICATIONS

Ona, "The key to a successful implementation of S/4 HANA Cloud (1/3)", SAP Blog, Jul. 18, 2017, 18 pages.

Ona, "The key to a successful implementation of S/4 HANA Cloud (2/3)", SAP Blog, Sep. 14, 2017, 12 pages.

Ona, "The key to a successful implementation of S/4 HANA Cloud (3/3)", SAP Blog, Oct. 11, 2017, 9 pages.

* cited by examiner

CLOUD-BASED FISCAL YEAR VARIANT CONVERSION

BACKGROUND

Enterprise resource planning (ERP) is software that allows an organization to use a system of integrated applications to manage their business and automate many back-office functions related to technology, services and human resources. ERP software typically integrates day-to-day processes of an enterprise (for example, order-to-cash, procure-to-pay, plan-to-product, and request-to-service) and core capabilities in a single database, application and user interface. While on-premise ERP software is installed locally, typically on a company's own computers and servers, cloud ERP software is hosted on the vendor's servers and accessed through a web browser. Cloud ERP system technology has been adopted by more and more businesses because it generally has much lower upfront costs (because computing resources are leased by the companies rather than purchased outright and maintained on premise) and it also gives companies access to their business-critical applications at any time from any location.

However, existing ERP systems, either on-premise or cloud-based, have limited flexibility to reconfigure the fiscal setting after deployment. Thus, there remains a need for an improved ERP system that allows users to reconfigure the fiscal year setting after it has been deployed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments of the disclosure concern a computer-implemented method. The method can include, in a deployed enterprise resource planning system implementing a first fiscal year variant, configuring a second fiscal year variant, wherein the second fiscal year variant is different from the first fiscal year variant; identifying a list of target tables in the deployed enterprise resource planning system that contains the first fiscal year variant; converting the first fiscal year variant to the second fiscal year variant in the list of target tables; and replacing the first fiscal year variant with the second fiscal year variant in a reference framework interfacing with the list of target tables.

Certain embodiments of the disclosure also concern a system that includes one or more processors and memory coupled to the one or more processors comprising instructions causing the one or more processors to perform a method. The method can include: in a deployed enterprise resource planning system implementing a first fiscal year variant, configuring a second fiscal year variant, wherein the second fiscal year variant is different from the first fiscal year variant; identifying a list of target tables in the deployed enterprise resource planning system that contains the first fiscal year variant; converting the first fiscal year variant to the second fiscal year variant in the list of target tables; and replacing the first fiscal year variant with the second fiscal year variant in a reference framework interfacing with the list of target tables.

Certain embodiments of the disclosure further concern one or more computer-readable media having encoded thereon computer-executable instructions causing one or more processors to perform a method. The method can include: in a deployed enterprise resource planning system implementing a first fiscal year variant, configuring a second fiscal year variant, wherein the second fiscal year variant is different from the first fiscal year variant; identifying a list of target tables in the deployed enterprise resource planning system that contains the first fiscal year variant; converting the first fiscal year variant to the second fiscal year variant in the list of target tables; and replacing the first fiscal year variant with the second fiscal year variant in a reference framework interfacing with the list of target tables. The reference framework can include at least a storage entity. The storage entity can include at least a keystring. The keystring can include a predefined text pattern followed by a first fiscal year variant identifier representing the first fiscal year variant or a second fiscal year variant identifier representing the second fiscal year variant. The keystring can correspond to a unique identifier that remains constant after changing the first fiscal year variant identifier to the second fiscal year variant identifier. Identifying the list of target tables can include: in a repository in the enterprise resource planning system, searching for a domain parameter that contains a predefined identifier representing the first fiscal year variant. The repository can include a schema containing a complete list of database tables and respective fields in the database tables. Replacing the first fiscal year variant to the second fiscal year variant in the reference framework can include: identifying a plurality of storage entities in the reference framework; searching for the predefined text pattern in the identified plurality of storage entities, wherein the predefined text pattern is followed by the first fiscal year variant identifier representing the first fiscal year variant; and for one or more found predefined text patterns in the identified plurality of storage entities, replacing the first fiscal year variant identifier with the second fiscal year variant identifier representing the second fiscal year variant; generating a hashed key based on the keystring that comprises the predefined text pattern and the first fiscal year variant identifier; and regenerating the hashed key after replacing the first fiscal year variant identifier with the second fiscal year variant identifier in the keystring.

The foregoing and other objects, features, and advantages will become more apparent from the following detailed description, which proceeds with reference to the accompanying figures.

DETAILED DESCRIPTION

Example 1—Overview

Figure 1:
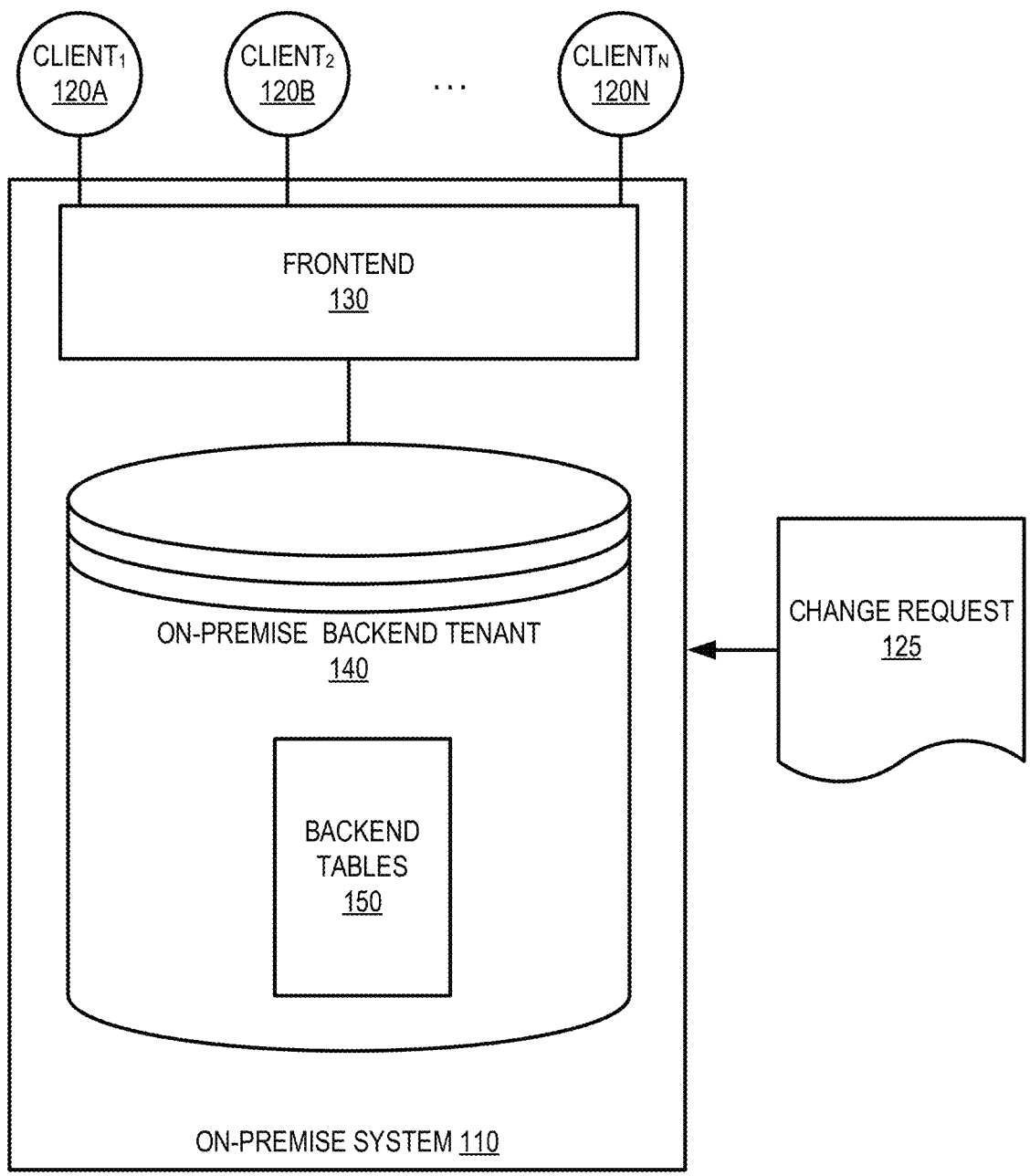
FIG. 1 is a block diagram of an example on-premise ERP system implementing the described technologies.

Existing ERP systems have limited flexibility to reconfigure fiscal year settings after deployment.

A fiscal year is a time period (usually 12 months) for which a company can use for financial reporting and budgeting purposes (e.g., providing physical inventory count, balance sheet, etc.). The fiscal year may, but is not required to, correspond exactly to the calendar year (i.e., from January 1st to December 31st).

A fiscal year can be divided into a plurality of posting periods. Each posting period can be defined by a start date and an end date. Before one can post documents, one can define the posting periods, and thereby the fiscal year, in the computing system. In addition to the posting periods, one can define special periods for the year-end closing. As described herein, the posting periods and the special periods in a fiscal year are also referred to as the bookkeeping periods.

Since it is possible that multiple companies are running business in a single ERP system and it is also possible that each of the companies follows a different fiscal year, there can be multiple different versions of fiscal years defined in the ERP system. Each of these versions of fiscal year definition can be used by a specific company or a specific business within the company.

As described herein, the fiscal year variant (FYV) defines the relationship between the calendar year and the fiscal year. For example, the FYV can specify the number of periods and special periods and the start and end date of a fiscal year. In addition, the FYV can define how the ERP system determines the posting period to assign when posting a journal entry. Some examples of FYVs are described in the next section.

Thus, one can define a fiscal year in the form of a FYV, which can then be assigned to the company code or company codes. The same FYV can be applied to the entire ERP system with its ledgers and company codes. Thus, the FYV is a basic building block of an ERP system.

Irrespective of cloud or on-premise environment, service providers of the ERP systems usually allow their customers to define the FYV or use predefined FYV when the system is being setup during initial configuration of the system, when a new business is being configured in the ERP system, or when a new company is being setup in the already existing ERP system.

After the ERP system is deployed, due to legal or business reasons (e.g., business acquisition or merger), there is a possibility that the customer may want to switch to a different fiscal year definition (i.e., change to a different FYV) than what is currently implemented in the ERP system.

However, existing ERP systems have limited flexibility to reconfigure the FYV after deployment. For example, after the ERP system goes live (e.g., customers are actively using the ERP system) changing the FYV in the ERP system can be technically challenging due to system constraints. This is because based on the initial FYV configuration, a large amount of data being created by day-day activities in the company are already stored in many backend tables of the ERP system. Such data can be categorized as customizing data, master data, transactional data, and others. The number of backend tables can range from hundreds to millions, or more. Whenever a transaction is recorded in the system, based on the date or timestamp of the transaction, the periods are automatically calculated (based on the FYV being used by the company) and inserted in the corresponding backend tables. It is more challenging in the cloud environment where a reference framework interfaces with the backend tables, as described more fully below. As such, a customer may not be able to change the basic building block of the ERP system, such as the FYV definition, without compromising the integrity of backend tables and/or disrupting the system operations.

Thus, traditionally, if the customer insists on changing the FYV after the ERP system is deployed, the customer may have to discard the historical transactional data that has been accumulated by the system and re-implement the ERP solution afresh with the newly defined FYV.

The described technologies herein can provide a system and method for changing the FYV after the ERP system (either on-premise or cloud-based) is deployed, thus offering considerable improvements over conventional ERP systems.

Example 2—Examples of Fiscal Year Variants

As examples, the following describes several different FYV configurations.

In one example, the FYV can be configured based on the following table, which includes 12 posting periods corresponding to 12 calendar months from January to December, plus 4 special periods. As described herein, such FYV is referred to K4, which can be used for financial accounting.

| Period | Last Day (mm/dd/yyyy) | Text | Calendar Week | Day |
|---|---|---|---|---|
| 1 | 01/31/2019 | January | 05/2019 | Thursday |
| 2 | 02/28/2019 | February | 09/2019 | Thursday |
| 3 | 03/31/2019 | March | 13/2019 | Sunday |
| 4 | 04/30/2019 | April | 18/2019 | Tuesday |
| 5 | 05/31/2019 | May | 22/2019 | Friday |
| 6 | 06/30/2019 | June | 26/2019 | Sunday |
| 7 | 07/31/2019 | July | 31/2019 | Wednesday |
| 8 | 08/31/2019 | August | 35/2019 | Saturday |
| 9 | 09/30/2019 | September | 40/2019 | Monday |
| 10 | 10/31/2019 | October | 44/2019 | Thursday |
| 11 | 11/30/2019 | November | 48/2019 | Saturday |
| 12 | 12/31/2019 | December | 01/2020 | Tuesday |
| 13 | 12/31/2019 | Period 13 | 01/2020 | Tuesday |
| 14 | 12/31/2019 | Period 14 | 01/2020 | Tuesday |

-continued

| Period | Last Day (mm/dd/yyyy) | Text | Calendar Week | Day |
|---|---|---|---|---|
| 15 | 12/31/2019 | Period 15 | 01/2020 | Tuesday |
| 16 | 12/31/2019 | Period 16 | 01/2020 | Tuesday |

In another example, the FYV can be configured based on the following table, which shows 24 posting periods. As described herein, such FYV is referred to K4, which can be used for asset accounting.

| Period | Last Day (mm/dd/yyyy) | Text | Calendar Week | Day |
|---|---|---|---|---|
| 1 | 01/15/2019 | Period 1 | 03/2019 | Tuesday |
| 2 | 01/31/2019 | Period 2 | 05/2019 | Thursday |
| 3 | 02/15/2019 | Period 3 | 07/2019 | Friday |
| 4 | 02/28/2019 | Period 4 | 09/2019 | Thursday |
| 5 | 03/15/2019 | Period 5 | 11/2019 | Friday |
| 6 | 03/31/2019 | Period 6 | 13/2019 | Sunday |
| 7 | 04/15/2019 | Period 7 | 16/2019 | Monday |
| 8 | 04/30/2019 | Period 8 | 18/2019 | Tuesday |
| 9 | 05/15/2019 | Period 9 | 20/2019 | Wednesday |
| 10 | 05/31/2019 | Period 10 | 22/2019 | Friday |
| 11 | 06/15/2019 | Period 11 | 24/2019 | Saturday |
| 12 | 06/30/2019 | Period 12 | 26/2019 | Sunday |
| 13 | 07/15/2019 | Period 13 | 29/2019 | Monday |
| 14 | 07/31/2019 | Period 14 | 31/2019 | Wednesday |
| 15 | 08/15/2019 | Period 15 | 33/2019 | Thursday |
| 16 | 08/31/2019 | Period 16 | 35/2019 | Saturday |
| 17 | 09/15/2019 | Period 17 | 37/2019 | Sunday |
| 18 | 09/30/2019 | Period 18 | 40/2019 | Monday |
| 19 | 10/15/2019 | Period 19 | 42/2019 | Tuesday |
| 20 | 10/31/2019 | Period 20 | 44/2019 | Thursday |
| 21 | 11/15/2019 | Period 21 | 46/2019 | Friday |
| 22 | 11/30/2019 | Period 22 | 48/2019 | Saturday |
| 22 | 11/30/2019 | Period 22 | 48/2019 | Saturday |
| 23 | 12/15/2019 | Period 23 | 50/2019 | Sunday |
| 24 | 12/31/2019 | Period 24 | 01/2020 | Tuesday |

The FYV can also be configured to match the 4-4-5 calendar or its variants. The 4-4-5 calendar is a method of managing accounting periods, and is a common calendar structure for some industries such as retail and manufacturing. Specifically, the 4-4-5 calendar divides a year into four quarters of 13 weeks grouped into two 4-week "months" and one 5-week "month." The grouping of 13 weeks may also be set up as 5-4-4 weeks or 4-5-4 weeks. One major advantage of such calendar over a regular calendar is that the end date of the period is always the same day of the week, which can be useful for shift or manufacturing planning as every period is about the same length.

For example, as shown in the following table, the FYV can be configured to match the 5-4-4 calendar, where each of the 12 posting periods ends on a Saturday. In addition, the FYV can have 4 special periods at the end of the fiscal year. As described herein, such FYV is referred to SZ, which can be used for financial accounting.

| Period | Last Day | Text | Calendar Week | Day |
|---|---|---|---|---|
| 1 | 02/01/2020 | January | 05/2020 | Saturday |
| 2 | 02/29/2020 | February | 09/2020 | Saturday |
| 3 | 03/28/2020 | March | 13/2020 | Saturday |
| 4 | 05/30/2002 | April | 18/2020 | Saturday |
| 5 | 05/30/2020 | May | 22/2020 | Saturday |
| 6 | 06/27/2020 | June | 26/2020 | Saturday |
| 7 | 08/01/2020 | July | 31/2020 | Saturday |
| 8 | 08/29/2020 | August | 35/2020 | Saturday |
| 9 | 09/26/2020 | September | 39/2020 | Saturday |
| 10 | 10/31/2020 | October | 44/2020 | Saturday |
| 11 | 11/28/2020 | November | 48/2020 | Saturday |
| 12 | 12/31/2020 | December | 53/2020 | Thursday |
| 13 | 12/31/2020 | Period 13 | 53/2020 | Thursday |
| 14 | 12/31/2020 | Period 14 | 53/2020 | Thursday |
| 15 | 12/31/2020 | Period 15 | 53/2020 | Thursday |
| 16 | 12/31/2020 | Period 16 | 53/2020 | Thursday |

Corresponding to SZ, another FYV, herein referred to SA, can be configured for asset accounting. Generally, the start date and end date of SA are respectively the same as the start date and end date of SZ. Other than such requirement, the posting period definition of SZ and SA can be independent of each other. In one example, for the SZ described above, the SA can be configured to have identical 24 posting periods as M4. In other examples, the SA can be different from M4 (e.g., when the first posting period of SZ starts from April and the last posting period ends in March of the following year, the corresponding posting periods of SA are also time-shifted). In an ERP system, the pair of K4 and M4 configurations can be used for financial and asset accounting, respectively. Similarly, SZ and SA can be FYV pairs that are used for financial and asset accounting respectively. If one chooses to use customer defined FYV for financial accounting (e.g., SZ), then one can configure corresponding SA for asset accounting. In some embodiments, the user can define a FYV to include two configurations: one for financial accounting and one for asset accounting, wherein each configuration has its respectively defined posting periods and/or special periods (e.g., K4 and M4, or SZ and SA).

It should be noted that the FYV configurations described above are merely exemplary. In general, the user can customize an FYV configuration so that it can include one or more posting periods. In addition, the customized FYV configuration can include zero, one, or more special periods. Further, the start date, the end date, or the length of each posting period of the customized FYV configuration can be user-defined.

As described above, after a customer goes live on a traditional ERP system with predefined FYVs (for example the customer chose K4 and M4 combination for the customer's financial accounting and asset accounting respectively, which has 12+4 periods and 24 periods, respectively), it can be technically difficult for the customer to switch to other customized FYVs (For example, SZ as 5-4-4 structure and SA as 24 periods). The described technologies herein provide a solution to such problems. As a result, the ERP system can smoothly switch to new FYVs configured by the customer so that the system not only can handle new transactional data based on the new FYVs, but also convert old transactions in the system that were previously recorded using old FYVs.

Example 3—Example Overall System of ERP Solutions

FIG. 1 is a block diagram of an example overall system 100 implementing an on-premise ERP system 110. In the example, the on-premise ERP system 110 can comprise a frontend 130 and an on-premise backend tenant system 140. The on-premise backend tenant system 140 (or simply "tenant") can comprise a plurality of backend tables 150.

As described herein, any of the backend tables 150 can be configured to store customizing data, or master data, or transactional data, or any other types of data. The backend-tables 150 can contain a plurality of fields or attributes and a plurality of records corresponding to the plurality of fields or attributes. The plurality of backend tables 150 can relate to each other via the plurality of fields or attributes, and can be managed by a database engine (not shown) located on the on-premise backend tenant 140.

As described herein, the on-premise ERP system 110 can be configured to implement one or more FYVs (e.g., a pair of K4 and M4 as described above). Each of the FYVs can be represented by a corresponding identifier (e.g., "K4" and "M4"). The FYV identifiers can be present in one or more of these backend tables 150.

One or more client machines 120A-N (e.g., operated by customers of the on-premise ERP system 110) can interact with the on-premise ERP system 110 through the frontend 130. For example, after the on-premise ERP system 110 is deployed, any of the clients 120A-N can enter data into or access data from the backend tables 150 located on the on-premise backend tenant 140 by interacting with the frontend 130. In other words, the on-premise ERP system 110 can support multiple clients simultaneously exchanging information with the backend tables 150.

As depicted in FIG. 1, a change request 125 can be sent to the on-premise ERP system 110. For example, the change request 125 can be sent by any of the clients 120A-N or some other source. In some embodiments, the change request 125 can request a change of the FYVs in the on-premise ERP system 110. Upon receiving the change request 125, the on-premise ERP system 110 can initiate a change of the specified FYVs in the backend tables 150. As a result, the old FYVs in the backend tables 150 can be replaced with the corresponding new FYVs.

Figure 2:
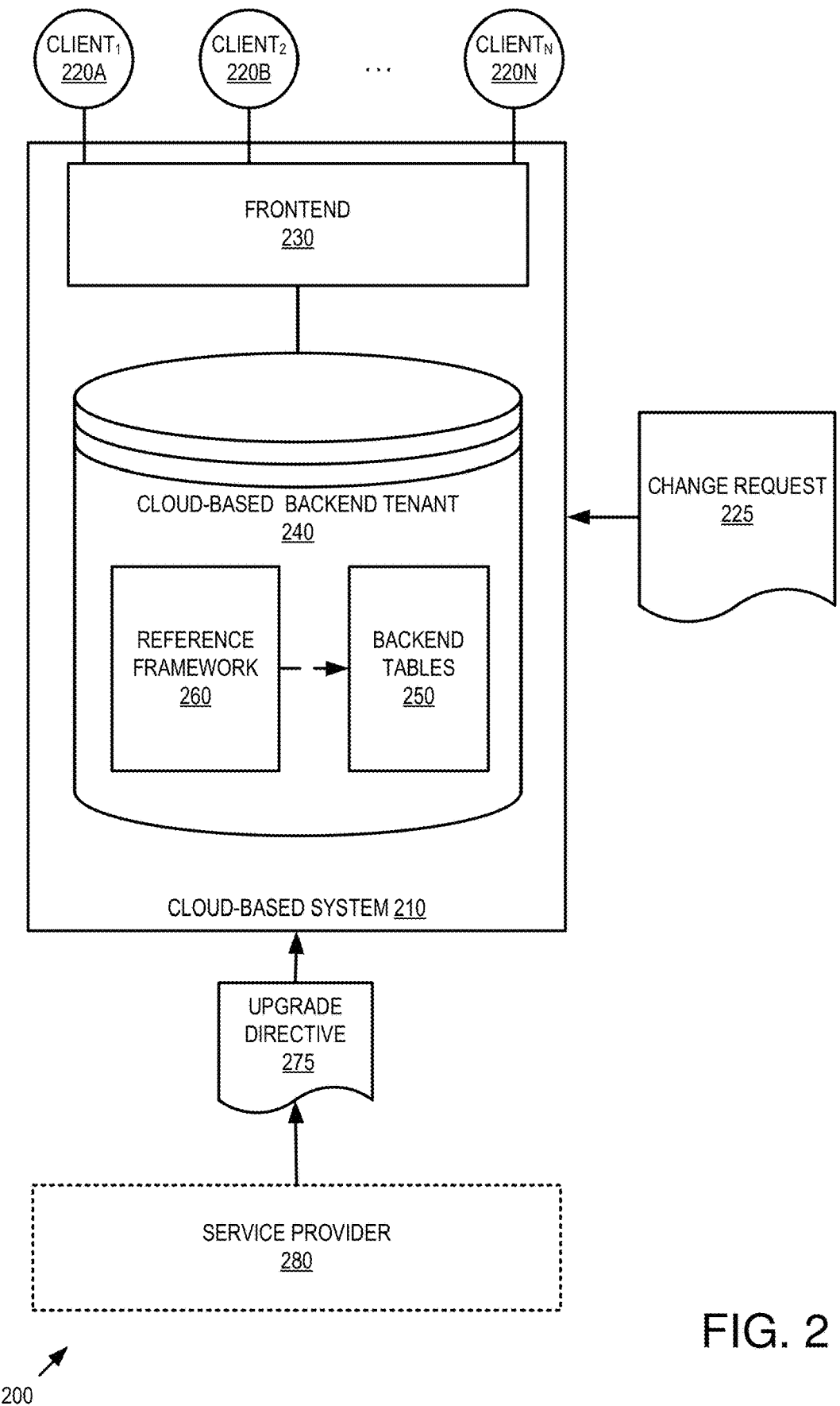
FIG. 2 is a block diagram of an example cloud-based ERP system implementing the described technologies.

FIG. 2 is a block diagram of an example overall system 200 implementing a cloud ERP system 210. In the example, the cloud ERP system 210 can comprise a frontend 230 and a cloud-based backend tenant system 240. Although a single tenant system 240 is shown, in practice, the cloud-based system 210 can implement systems for a plurality of tenants (e.g., different organizations) in a multi-tenant system that conduct their day-to-day operations via the cloud-based system 210.

In the depicted example, the cloud-based backend tenant system 240 (or simply "tenant") can comprise a plurality of backend tables 250 that store customer data and a reference framework 260 interfacing with the plurality of backend tables 250. For example, the reference framework 260 can be a software module embedded in the cloud-based backend tenant 240.

In an alternative embodiment, the reference framework 260 can be located external to the cloud-based backend tenant 240, but still interface with the backend tables 250. For example, the reference framework 260 can be a stand-alone software application that is configured to interface with the backend tables 250 located on the cloud-based backend tenant 240.

A service provider 280 of the cloud ERP system 210 can send an upgrade directive 275 to the cloud ERP system 210. Such upgrade directive 275 can include instructions, which, when executed, can initiate a software upgrade to the ERP system 210, for example, by specifying new features, functionalities, bug fixes, or scope change to be implemented in the cloud-based backend tenant 240. Upon receiving the upgrade directive 275, the reference framework 260 can be updated to reflect newly specified business processes according to the instructions, and further configured to modify the backend tables 250.

In some cases, upgrades can apply to a plurality of tenant systems, but, due to customization of the systems, different systems may be upgraded slightly differently.

Any of the backend tables 250 can be configured to store customizing data, or master data, or transactional data, or any other types of data. The backend-tables 250 can contain a plurality of fields or attributes and a plurality of records corresponding to the plurality of fields or attributes. The plurality of backend tables 250 can relate to each other via the plurality of fields or attributes, and can be managed by a database engine (not shown) located on the cloud-based backend tenant 240.

As described herein, the cloud ERP system 210 can be configured to implement one or more FYVs (e.g., a pair of K4 and M4 as described above). Each of the FYVs can be represented by a corresponding identifier (e.g., "K4" and "M4"). The FYV identifiers can be present in one or more of these backend tables 250. In addition, the FYV identifiers can be present in the reference framework 260.

One or more client machines 220A-N (e.g., operated by customers of the service provider 280 or another party) can interact with the cloud ERP system 210 through the frontend 230. For example, after the cloud ERP system 210 is deployed, any of the clients 220A-N can enter data into or access data from the backend tables 250 located on the cloud-based backend tenant 240 by interacting with the frontend 230. In other words, the cloud ERP system 210 can support multiple clients simultaneously exchanging information with the backend tables 250. In a multi-tenant system, the multiple clients can be operated by multiple parties or organizations.

As depicted in FIG. 2, a change request 225 can be sent to the cloud ERP system 210. For example, the change request 225 can be sent by any of the clients 220A-N or some other source. In some embodiments, the change request 225 can request a change of the FYVs in the cloud ERP system 200. Upon receiving the change request 225, the cloud ERP system 210 can initiate a change of the specified FYVs in the backend tables 250, as well as in the reference framework 160, as described more fully below. As a result, the old FYVs in the backend tables 250 and the reference framework can be replaced with the corresponding new FYVs.

In practice, the systems shown herein, such as the on-premise ERP system 110 and the cloud ERP system 210, can vary in complexity, with additional functionality, more complex components, and the like. For example, there can be additional functionality within the backend tenant 140 or 240. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The on-premise ERP system 110 and cloud ERP system 210, as well as any of the other systems described herein can be implemented in conjunction with any of the hardware components described herein, such as the computing systems described below (e.g., processing units, memory, and the like). In any of the examples herein, computer-executable instructions for implementing the methods described herein, tables, change map, the input, output and intermediate data of running the ERP system 110 or 210, and the like can be stored in one or more computer-readable storage media or computer-readable storage devices. The technologies described herein can be generic to the specifics of operating systems or hardware and can be applied in any variety of environments to take advantage of the described features.

Example 4—Example Landscape of the ERP Systems

In an on-premise environment, ERP system resources are deployed in-house and within an enterprise's information technology (IT) infrastructure. The enterprise is responsible for maintaining the ERP solution and all its related processes. Since the enterprise owns the system infrastructure, it can modify and setup the ERP system according to its needs and fit its best practices.

Figure 3:
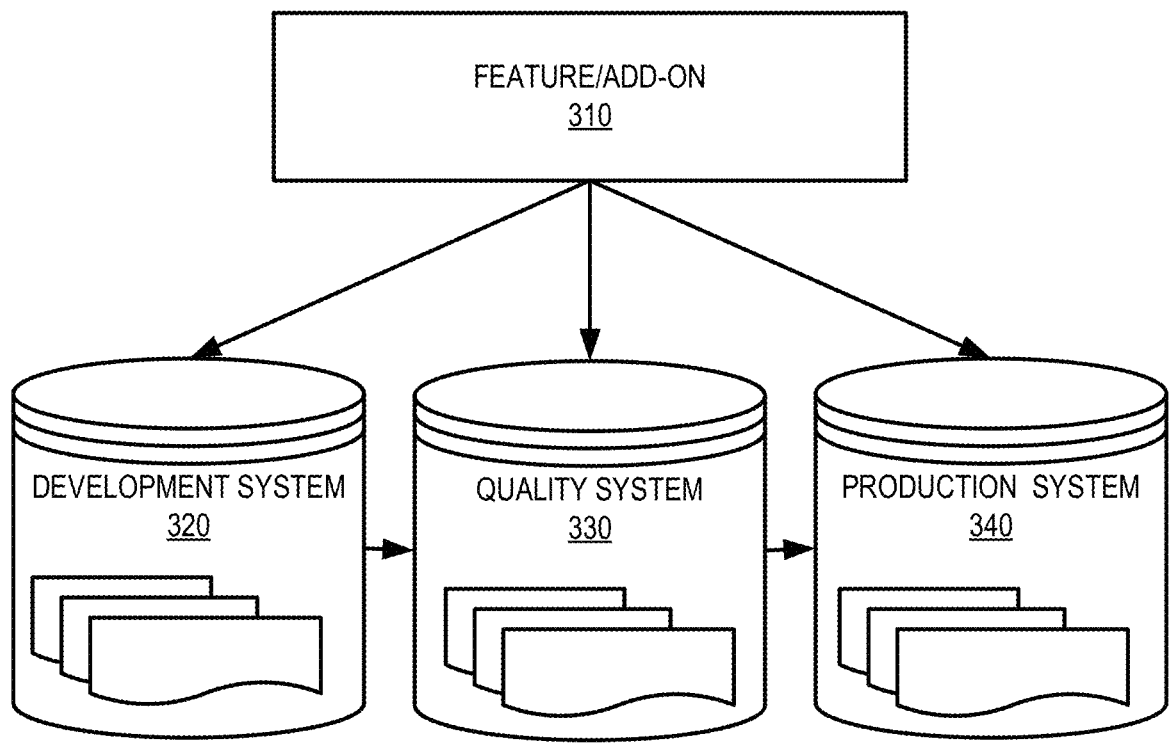
FIG. 3 is a block diagram illustrating the overall landscape of an on-premise ERP system.

FIG. 3 illustrates the schematic diagram of the landscape of an on-premise ERP system 300. In this example, the ERP system 300 can include three interconnected systems: a development system 320, a quality system 330, and a production system 340. The development system 320 is connected to the quality system 330, which is further connected to the production system 340. In some embodiments, new features and/or add-on modules 310 (e.g., provided by the service provider) can be separately installed in the development system 320, the quality system 330, as well as the production system 340.

In some embodiments, all new features and/or add-on modules can be first activated in the development system 320. The ERP system 300 can maintain a transport request which includes a list of changes that have been done to the system. Such changes can include code changes, database schema changes, database content changes, any user-interfaces changes, etc. Transport used in this context refers to identifying all the changes being done to the system and provides a mechanism to move these changes (or make corresponding changes) in the subsequent systems. Any software corrections can be implemented in the development system 320 and locked in the transport request. Next, the new features and/or add-on modules can be activated in the quality system 330. In addition, the changes listed in the transport request can be moved from the development system 320 to the quality system 330. Then, the new features and/or add-on modules can be tested in the quality system 330. After being fully tested (e.g., passing predefined quality checks), the new features and/or add-on modules can be activated in the production system 340. In addition, the same changes listed in the transport request (which is fully tested) can be released from the quality system 330 to the production system 340.

Figure 4:
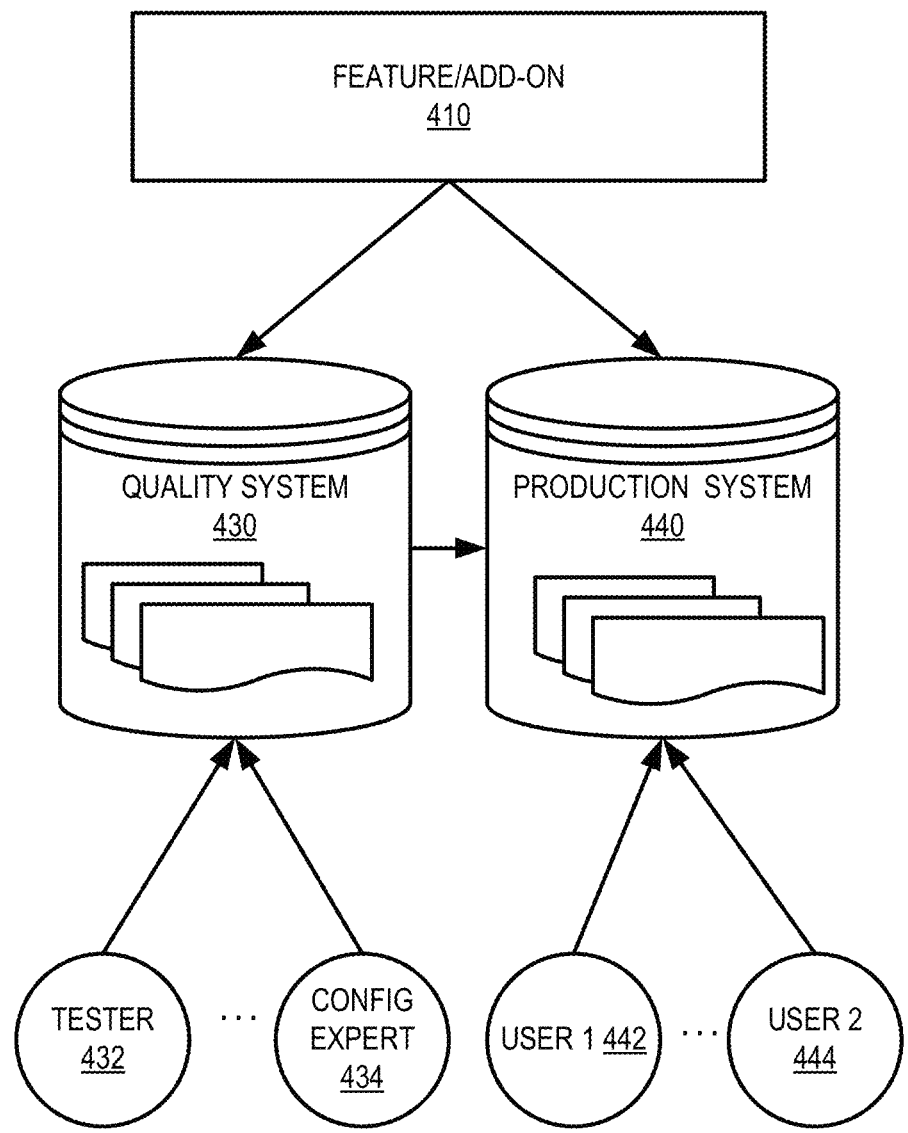
FIG. 4 is a block diagram illustrating the overall landscape of a cloud-based ERP system.

FIG. 4 illustrates the schematic diagram of the landscape of a cloud-based ERP system 400. In this example, the cloud-based ERP system 400 can include a quality system 430 and a production system 440, which are connected to each other. When the changes (e.g., new features and/or add-on modules 410) are pushed from the service provider, these changes can first be tested in the quality system 430 before being released to the production system 440. In other words, customer can make customized configuration changes to implement the new features and/or add-on modules 410, test such customized configurations and then move the fully tested configurations to the production system 440.

For example, business configuration experts 434 can make necessary configuration changes in the quality system 430. Then, after the testers 432 test and approve these changes (e.g., after completing and passing one or more predetermined quality checks), these configuration changes can be released to the production system 440, which can be accessed by users 442, 444.

Figure 5:
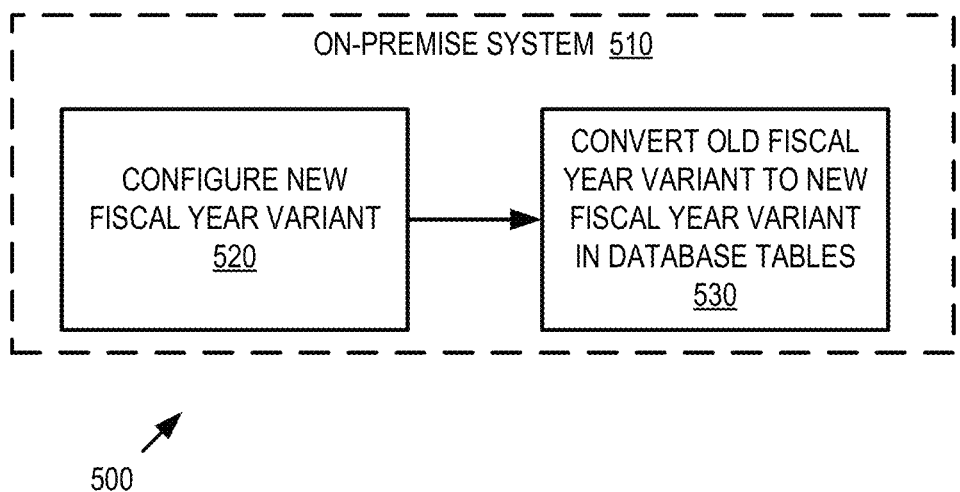
FIG. 5 is a block diagram illustrating the overall approach for changing the fiscal year variant in an on-premise ERP system.

Example 5—Example Overall Approach of Changing Fiscal Year Variant in the ERP System FIG. 5 illustrates the overall approach 500 for changing the FYV in an on-premise ERP system 510. As shown, the approach 500 can include two stages. At stage 520, a client can configure or create the new FYV (e.g., through a computer interface) that will be implemented in the system 510, for example, by specifying the number of periods and the start and end date of each period. At stage 530, the client can launch a software application on the system for automatic conversion of the FYV. Specifically, the application can identify a list of database tables in the deployed ERP system 510 that contains the old FYV, and convert the old FYV to the new FYV in the identified list of database tables.

In some embodiments, the stages 520, 530 can be implemented sequentially (e.g., first implemented in the quality system, then implemented in the production system). In alternative embodiments, the stages 520, 530 can be implemented simultaneous in both the quality system and the production system.

Figure 6:
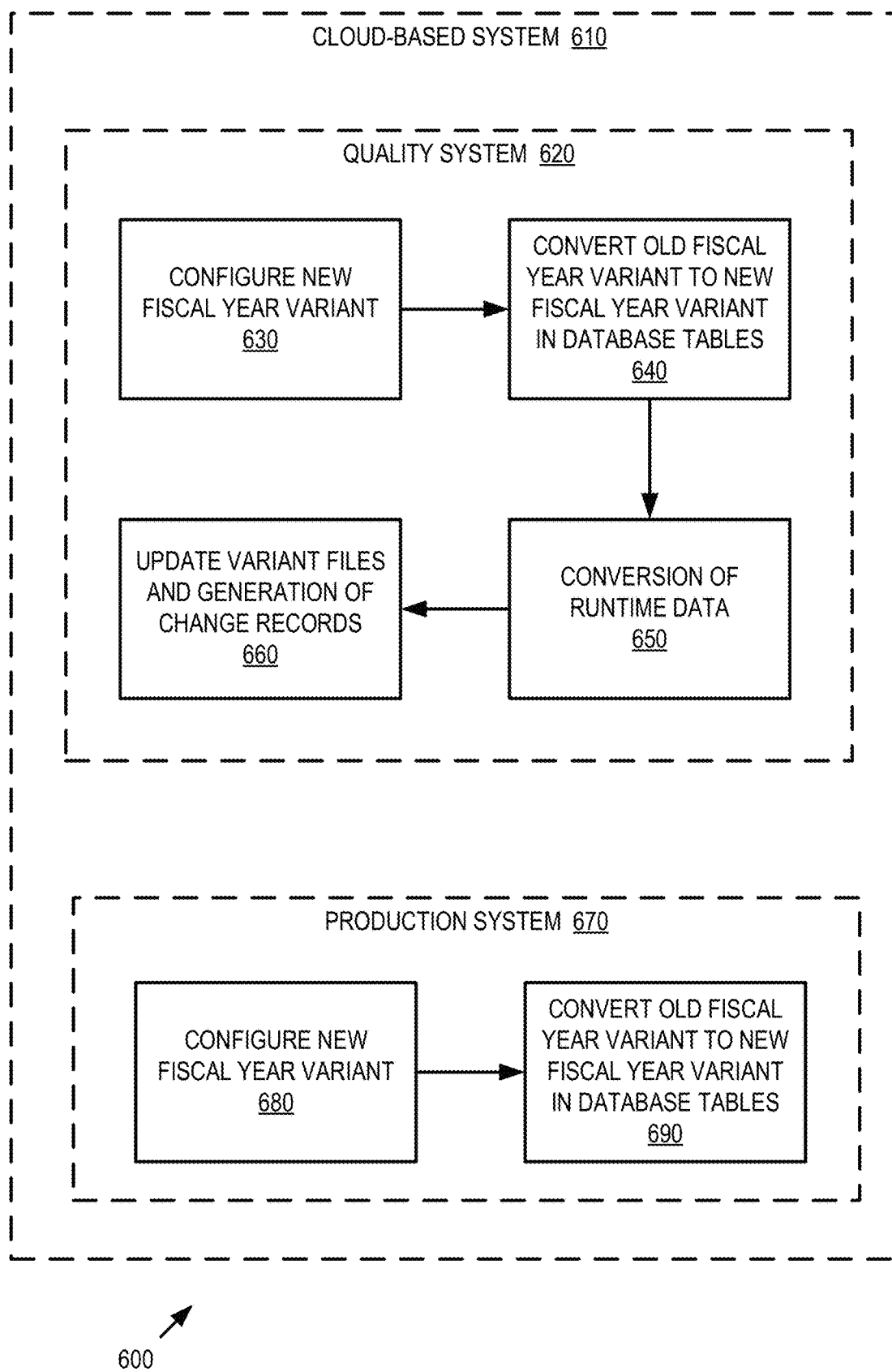
FIG. 6 is a block diagram illustrating the overall approach for changing the fiscal year variant in a cloud-based ERP system.

FIG. 6 illustrates the overall approach 600 for changing the FYV in a cloud ERP system 610. As shown, the approach 600 can include separate implementations in both the quality system 620 and the production system 670. The implementation in the production system 670 can include two stages similar to those implemented in the on-premise system: configuring the new FYV (stage 680) and converting the old FYV to the new FYV in database tables (stage 690). On the other hand, the implementation in the quality system 620 can include four stages: configuring the new FYV (stage 630), converting the old FYV to the new FYV in database tables (stage 640), converting the runtime data (stage 650), and updating variant files and generating change records (660).

Stages 630 and 640 implemented in the quality system 620 are similar to the corresponding stages 680 and 690 implemented in the production system 670, thus ensuring the production system 610 remains synchronized with the quality system 620. The methods of implementing these stages are described more fully below.

Figure 7:
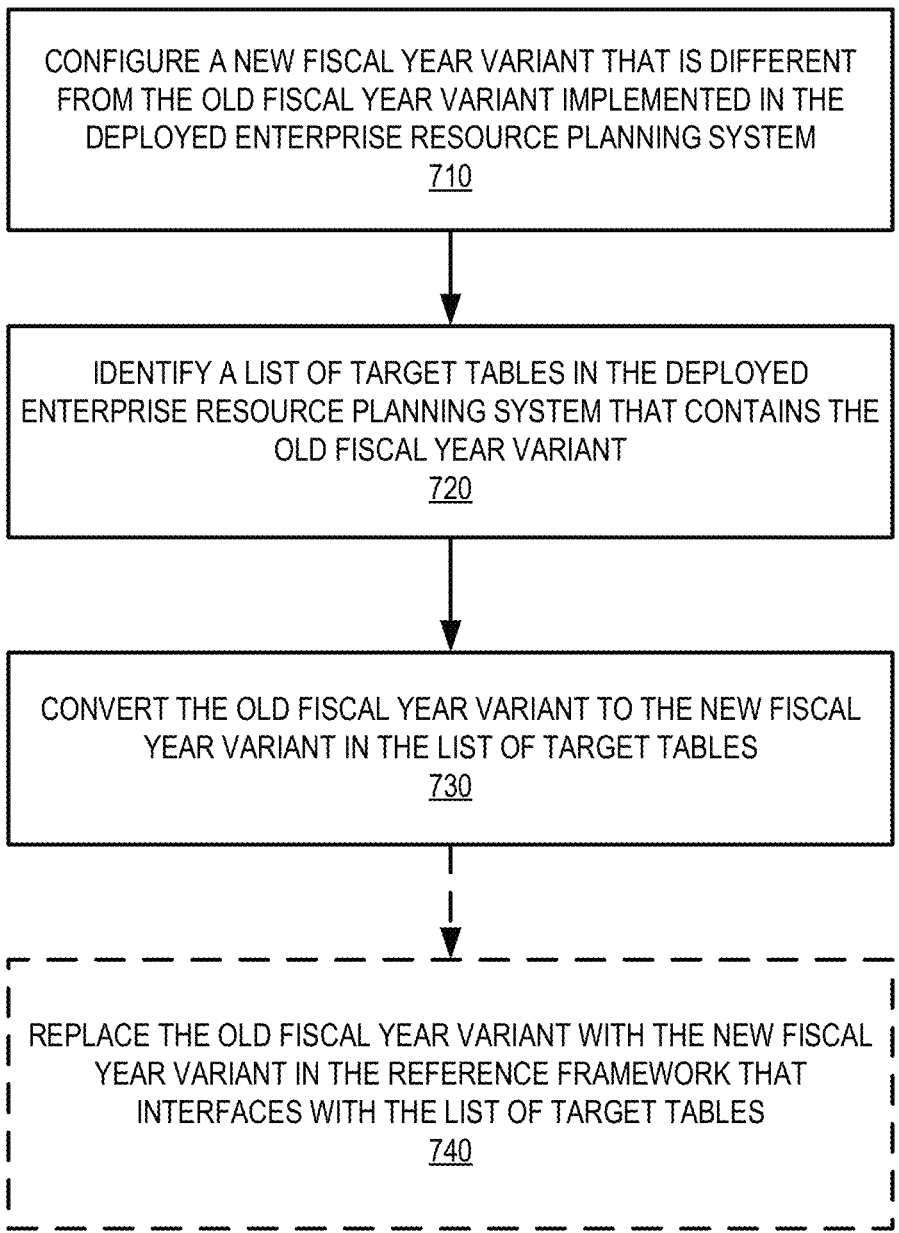
FIG. 7 is a flowchart illustrating an example overall method of changing the fiscal year variant in an ERP system.

Example 6—Example Overall Operational Method of Replacing Fiscal Year Variant in a Deployed ERP System FIG. 7 is a flowchart depicting an example overall operational method 700 of changing FYV in a deployed ERP system that can be used in any of the examples herein. The method 700 can be performed, for example, by the systems described in FIG. 1 and FIG. 2.

In this example, after receiving a change request to change the FYV (e.g., from an old FYV to a new FYV) in a deployed ERP system, the user can configure or define the new FYV at 710 through a user-interface at the front-end of the ERP system. As described herein, the new FYV is different from the old FYV implemented in the deployed ERP system. At 720, the method can identify a list of target tables in the deployed ERP system that contains the old FYV. At 730, the method can convert the old FYV to the new FYV in the list of identified target tables. If the ERP system is deployed in a cloud environment, then at 740, the method can further replace the old FYV with the new FYV in a reference framework that interfaces with the list of target tables.

Although the method 700 describes replacing an old FYV with a new FYV, the method 700 can be applied to changing multiple old FYVs to respectively new FYVs in the deployed ERP system. For example, an old accounting FYV (e.g., K4) can be changed to a new accounting FYV (e.g., SZ), and an old asset FYV (e.g., M4) can be changed to a new asset FYV (e.g., SA).

The method 700 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 7—Example Method of Changing Fiscal Year Variant in Target Tables

In certain embodiments, the ERP system (e.g., the on-premise system ERP 110 in FIG. 1 or the cloud-based ERP system 210 in FIG. 2) can maintain a repository containing the schema for each of the backend tables (e.g., 150 or 250). Each schema can define the structure of a corresponding backend table, including the name of the backend table and all fields contained in such backend.

In one exemplary embodiment, the ERP system can be configured to allow a user to create a domain for technical definition of a table field such as the field type and length. For example, the user can use a domain to define the length (e.g., 2) and data type (e.g., character) of an FYV. The domain can then be assigned to the data element, which in turn can be assigned to the table fields. For example, assuming the domain PERIV refers to the FYV (with length=2 and data type=character), then any table field whose domain is PERIV contains the FYV.

The ERP system can maintain a repository that contains the complete list of tables and respective fields with assigned domain information. Thus, by searching for domain PERIV in this repository, a list of tables (also referred to "target tables" hereinafter) and the corresponding table fields containing the FYV can be identified. For example, to convert the old FYV (e.g., K4) in the backend tables to the new FYV (e.g., SZ), the method 700 can identify the list of target tables by searching for domain parameter PERIV in the repository that contains a predefined FYV identifier (e.g., "K4") representing the old FYV. Then, for each of the identified target tables, a conversion program can be instantiated to convert it from the old FYV to the new FYV.

In some embodiments, to make the FYV conversion consistently across the identified list of target tables, a parallel conversion process can be applied. For example, the method can generate or instantiate a plurality of programs that are directed to convert the FYV in one of the identified list of target tables. The plurality of programs can be run in parallel so that multiple backend tables can be processed simultaneously.

Example 8—Example Method of Changing Fiscal Year Variant in Reference Framework

After the cloud ERP system (e.g., 210 in FIG. 2) is activated based on a client's initial requirements, a large amount of data will be generated that will be subject to manipulation by future feature upgrades, bug fixes, or scope change to be introduced by the service provider.

Even after making consistent FYV conversions (i.e., converting the old FYV to the new FYV) across all the backend tables (e.g., 250 in FIG. 2), additional FYV conversions must be performed on the reference framework (e.g., 260 in FIG. 2) that interfaces with the backend tables. This is because the reference framework, which was initially activated by the service provider, contains runtime data that still refers to the old FYV. Thus, if no change is made to the reference framework, the reference framework will not be able to correctly interact with the backend tables that now implement the new FYV. Accordingly, the service provider will no longer be able to consistently deliver feature upgrades, bug fixes, or scope change to the cloud ERP system.

Figure 8:
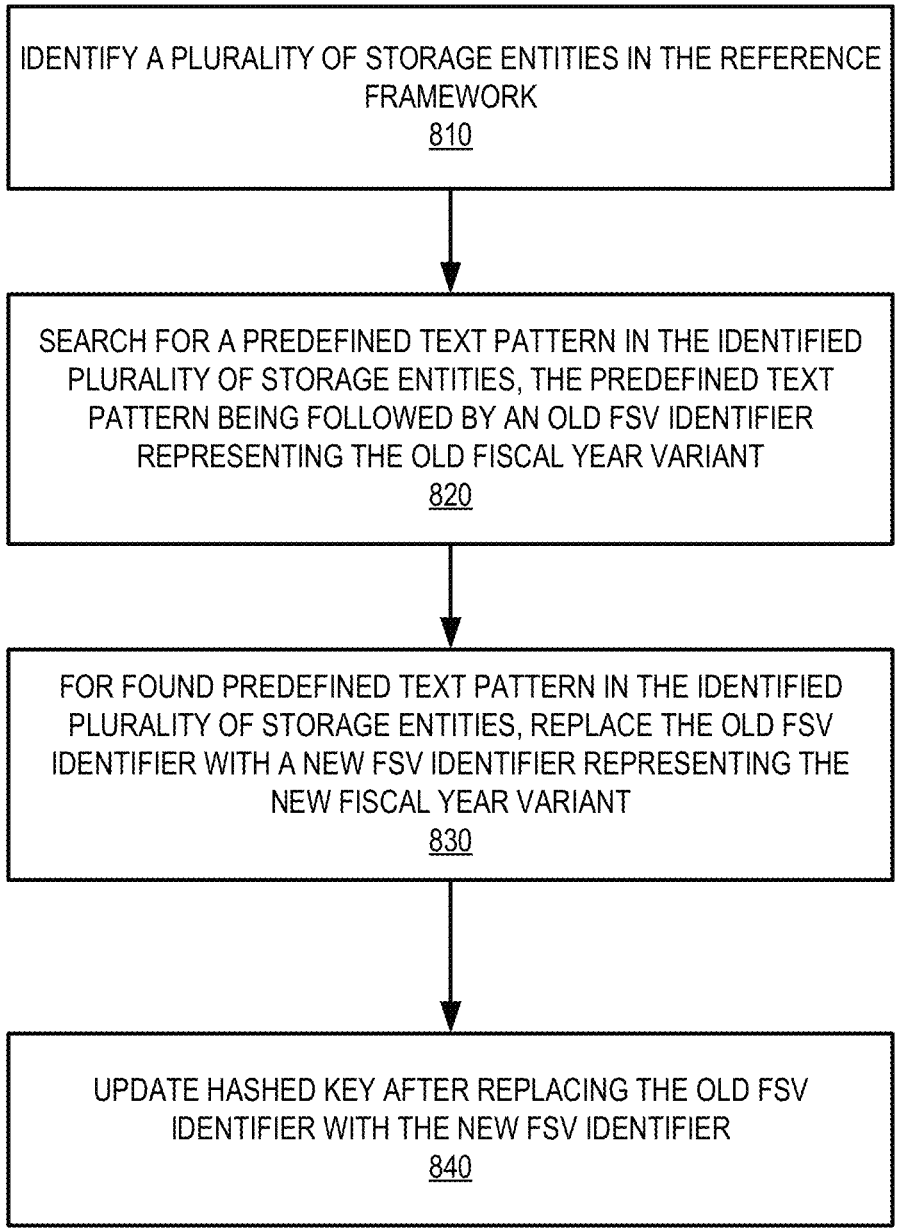
FIG. 8 is a flowchart illustrating an example method of changing the fiscal year variant in a reference framework of a cloud-based ERP system.

FIG. 8 is a flowchart 800 illustrating an example method of changing the FYV in the reference framework of a cloud ERP system.

At 810, the method can identify a plurality of storage entities in the reference framework that contain references to the FYV. Such references can be embodied in keystrings. As described herein, the storage entities can comprise any files or other storage artifacts that are present in the reference framework. For example, the storage entities can include separate files respectively containing company information, ledger information, management accounting, controlling account, etc. The files can have unique filenames or storage entity names.

As described herein, the keystring can be represented as a string of characters that contains a list of parameter name, parameter value pairs. For example, § I_BDATJ=0000§ I_BUMON=08§ I_BUTAG=01§ I_PERBSL=08§ I_PERIV=K4 can be a keystring that contains the following information: I_BDATJ is the parameter name for calendar year, and its associated value is 0000 (since the calendar year is 0000, it means that in this context, the calendar year is not taken into consideration). BUMON is the parameter name for calendar month, and its associated value is 08 (referring to the 8th month or period). I_BUTAG is the parameter name for calendar day of the month, and its associated value is 01 (referring to the 1st day of the 8th month). I_PERBSL is the parameter name for a period, and its associated value is 08 (referring to the 8th period). I_PERIV is the parameter name for a FYV, and its associated value is "K4," which is a two-character identifier for the FYV. Thus, this keystring refers to a specific FYV (e.g., K4). In this example, § is a separator that separates the parameter name and value pairs. Thus, this example keystring refers to a specific configuration in the FYV K4 (i.e., referring to the 8th month, the 8th period with a start date on the first day of the month). Thus, if the service provider wants to change this particular configuration, then the service provider can search this keystring to identify a target attribute and change the attribute. For example, the service provider can identify the FYV by searching for the parameter name I_PERIV in this keystring. In addition, each keystring can correspond to one or more backend configuration table or tables. Any changes made by service provider can be reflected in these configuration tables.

At 820, the method searches for a predefined text pattern (e.g., the parameter name I_PERIV) associated with an old FYV (e.g., K4) in the identified plurality of storage entities. Such text pattern comprises a reference to the FYV and can appear in keystrings. Within the storage entity, the predefined text pattern can be followed by the old FYV identifier (e.g., "K4"); the two can be joined by a linking string such as or the like. Searching can proceed by searching strings for occurrences of the predefined text pattern, searching strings for occurrences of the old FYV identifier, or searching strings for occurrences of a combination of the predefined text pattern in combination with the old FYV identifier (e.g., joined with a linking string such as or the like).

At 830, for each found predefined text pattern associated with the old FYV, the method can replace the old FYV identifier (e.g., "K4") with the new FYV identifier (e.g., "SZ") within the reference (e.g., keystring). The new FYV identifier represent the new FYV that will replace the old FYV in the cloud-ERP system.

As a result of the change, hashes of the keystrings will no longer be valid. At 840, the hash keys of the keystrings are updated as described in the following section.

Figure 9:
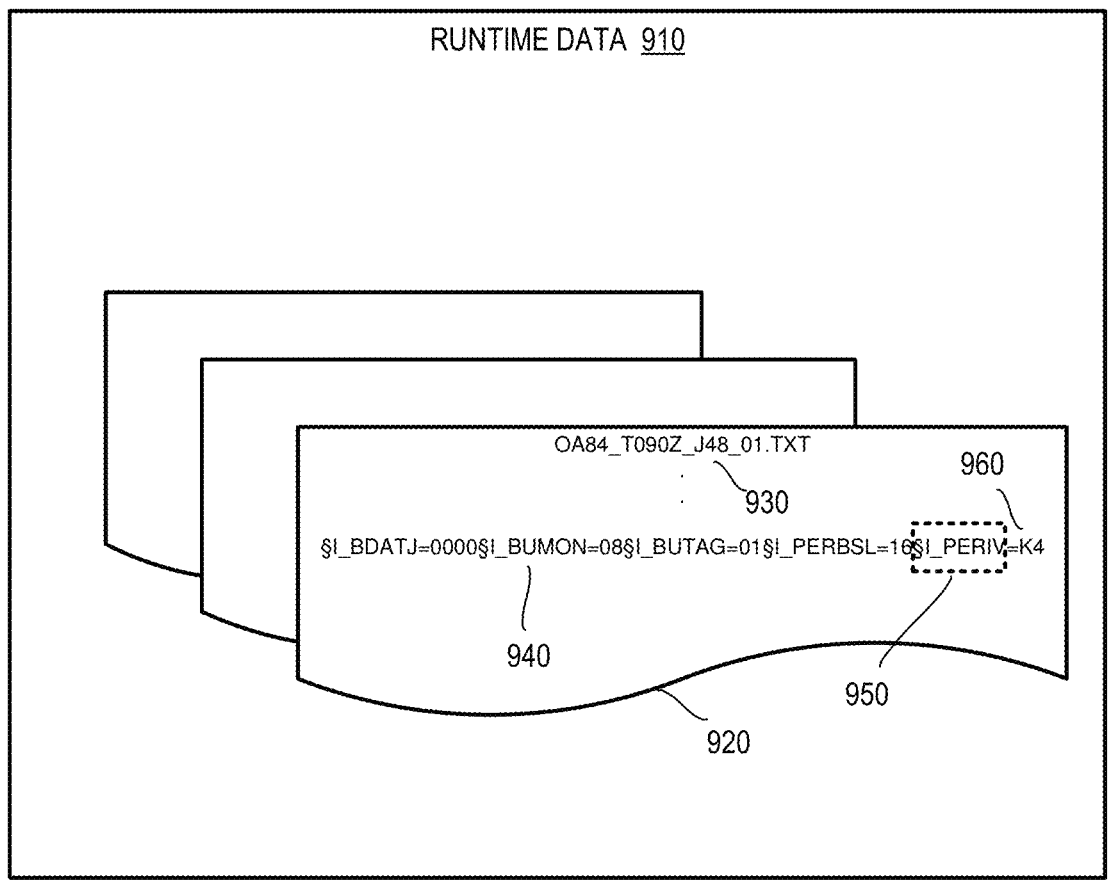
FIG. 9 is a diagram illustrating a relationship between runtime data in a reference framework, entities, and keystrings containing fiscal year variant identifiers.

FIG. 9 schematically illustrates the runtime data 910 of a reference framework that contains a plurality of storage entities 920 referencing the FYV. A storage entity can have a unique filename or storage entity name 930. In addition, the storage entities 920 can include a plurality of keystrings 940. After identifying the possible storage entities 920 that reference the FYV, then the method can identify the FYV referenced by the storage entities 920 based on a predefined parameter 950, which is followed by the FYV identifier 960.

For example, FIG. 9 shows that one of the storage entities has a filename "OA84_T090Z_J48_01.TXT." That storage entity contains a keystring "§ I_BDATJ=0000§ I_BUMON=08§ I_BUTAG=01§ I_PERBSL=16§ I_PERIV=K4." Here, the text string "I_PERIV" is a predefined parameter name (e.g., predefined text pattern) referencing the FYV. As shown, that parameter is followed by the FYV identifier "K4." Thus, by searching for the text pattern of the parameter name "I_PERIV" in the keystrings of the found storage entities, the old FYV identifiers (which follows the parameter name "I_PERIV") used by the reference framework can be located and replaced with corresponding new FYV identifiers within the keystrings.

Example 9—Example Hashed Keys

Figure 10:
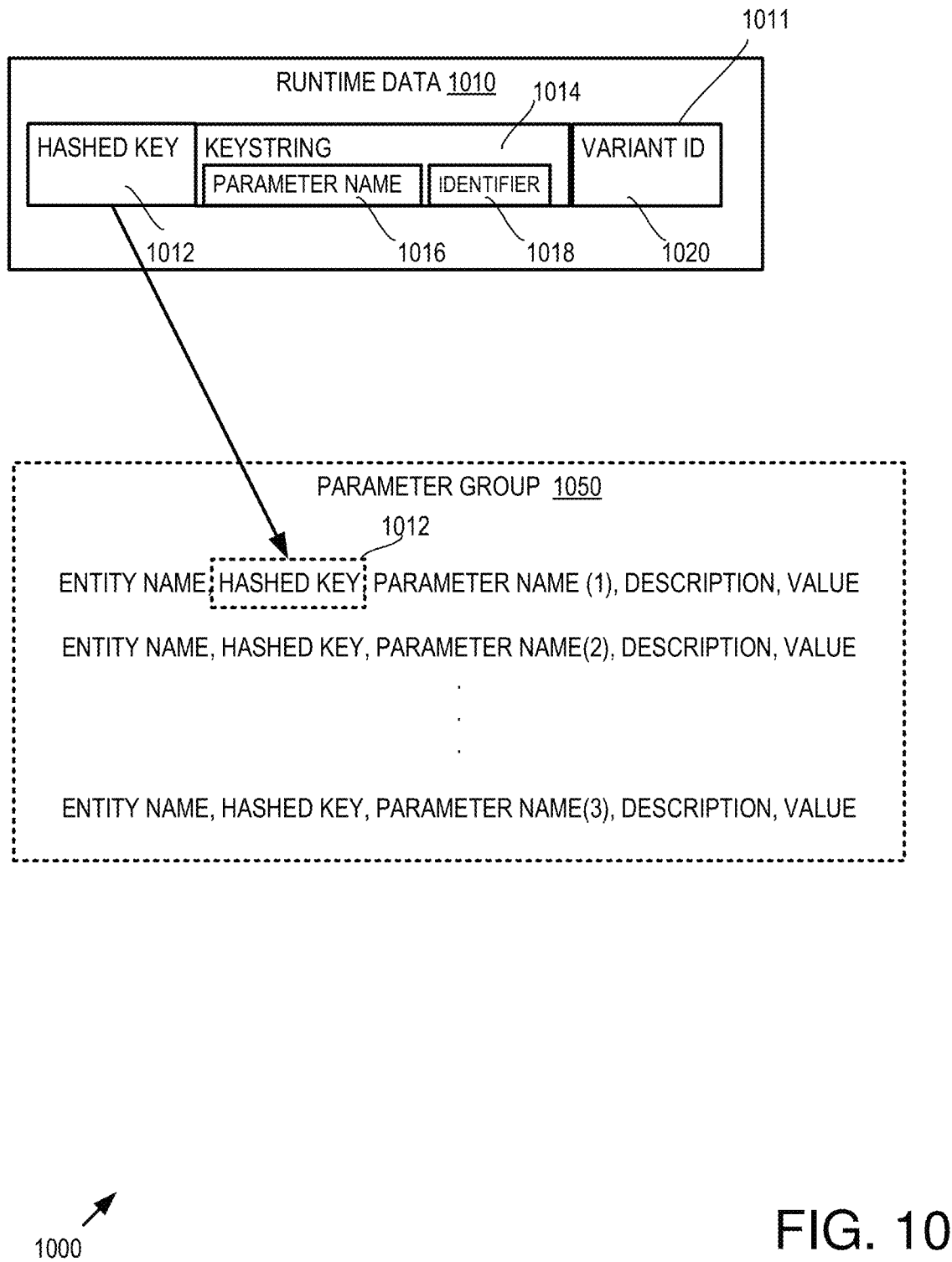
FIG. 10 is a diagram illustrating a relationship between hashed keys and parameter groups.

As illustrated in FIG. 10, the reference framework can maintain runtime data 1010, that contains a plurality of entries 1011. An entry 1011 can contain a keystring 1014 that contains one or more parameter names 1016, identifier 1018 (parameter value) pairs and a variant ID 1020. For example, the parameter name 1016 can be the predefined parameter "I_PERIV" referencing the FYV, and the identifier 1018 can be the FYV identifier "K4." An entry can contain a hashed key 1012 (e.g., calculated on the keystring 1014) that points into a parameter group 1050 that contains other parameters (e.g., parameter name/parameter value pairs) related to the parameters 1016/1018 of the entry 1011.

The parameter group 1050 contains entries with an entity name, hashed key, parameter name, description, and value for the parameters in the group. For example, a company parameter name and company identifier in a keystring can yield a hash value that correlates with a parameter group that has a number of parameter name/parameter value pairs for (e.g., particular to the company). During updates to the software, such parameters can be found and read or modified via the hashed key.

A query using the hashed key against a set of possible parameters (including the parameter group 1050 and other, unrelated parameters) can yield the parameter group 1050. Using a hash of the keystring can speed up the process as compared to trying to query using the keystring.

However, if the FYV identifiers are changed, the hashed keys are no longer valid (e.g., because the identifier or parameter value 1018 has changed). Therefore, they can be updated as described herein.

For illustration purposes, the table below shows an example hashed key 3954BF5E41C9631CFE7B20629EEC77EB8AF72D80 generated from the keystring § I_BDATJ=0000§ I_BUMON=08§ I_BUTAG=01§ I_PERBSL=16§ I_PERIV=K4 contained in the entity named "OA84_T090Z_J48_01.TXT."

| | |
|---|---|
| File name | OA84_T090Z_J48_01.TXT |
| Hashed key | 3954BF5E41C9631CFE7B20629EEC77EB8AF72D80 |
| Keystring | §I_BDATJ=0000§I_BUMON=08§I_BUTAG=01§I_PERBSL=08§I_PERIV=K4 |
| Variant | TUI8JzRFC4PFayk1fv5WzeXSHvo |

In some embodiments, the FYV can have multiple attributes. These attributes can be saved respective files, but they all share the same hashed key (e.g., they are in a parameter group as described herein).

The hashed key can link between the corresponding keystring and all attributes of such keystring. Thus, when there is a need to change one attribute of a specific FYV, the hashed key can help navigate from the keystring to the list of attributes.

For illustration purposes, the table below shows one example hashed key A5EE85FEA9C8B127E21F9E81609E842B9DF353B6 generated from the keystring § I_BDATJ=0000§ I_BUMON=03§ I_BUTAG=01§ I_PERBSL=03§ I_PERIV=K4.

| | |
|---|---|
| Client | 715 |
| Solution ID | Z_CUST_IE |
| File name | V_T090Z_V_T090Z_J48.TXT |
| Hashed key | A5EE85FEA9C8B127E21F9E81609E842B9DF353B6 |
| Char255 | §I_BDATJ=0000§I_BUMON=03§I_BUTAG=01§I_PERBSL=03§I_PERIV=K4 |
| Variant | X3yv1Bf87rfwpF6QPgA6VCjozHg= |
| Creation Time Stamp | 20, 190, 916, 170, 722 |

In this example, the hashed key refers to a keystring with the following configuration:

BDATJ=0000 (generally referring to calendar year, since it is 0000, it means that it is year independent)
BUMON=03 (referring to the 3rd calendar month)
BUTAG=01 (referring to the 1st calendar day)
PERBSL=03 (referring to the 3rd period)
PERIV=K4 (referring to Fiscal Year Variant is K4)

For example, the table below lists 7 attributes (each attribute has one corresponding file) that share the same hashed key.

| File name | Hashed key for keyfield values | Parameter | Description | Value |
|---|---|---|---|---|
| V_T090Z_V_T090Z_J48.TXT | A5EE85FEA9C8B127E21F9E81609E842B9DF353B6 | I_BDATJ | Calendar Year | 0000 |
| V_T090Z_V_T090Z_J48.TXT | A5EE85FEA9C8B127E21F9E81609E842B9DF353B6 | I_BUMON | Calendar month | 01 |
| V_T090Z_V_T090Z_J48.TXT | A5EE85FEA9C8B127E21F9E81609E842B9DF353B6 | I_BUTAG | Calendar day | 01 |
| V_T090Z_V_T090Z_J48.TXT | A5EE85FEA9C8B127E21F9E81609E842B9DF353B6 | I_PERAFA | Value date period | |
| V_T090Z_V_T090Z_J48.TXT | A5EE85FEA9C8B127E21F9E81609E842B9DF353B6 | I_PERBSL | Period control key | 03 |
| V_T090Z_V_T090Z_J48.TXT | A5EE85FEA9C8B127E21F9E81609E842B9DF353B6 | I_PERIV | Fiscal Year Variant | K4 |
| V_T090Z_V_T090Z_J48.TXT | A5EE85FEA9C8B127E21F9E81609E842B9DF353B6 | I_XMONMI | Independently calculated mid-month | |

The hashed key can link between the corresponding keystring and all attributes of such keystring. Hence, when the service provider wants to change the configuration described in the above table, the hashed key can help navigate from the keystring to the list of attributes (corresponding files).

In some embodiments, after each replacement of an old FYV identifier with a new FYV identifier, the corresponding hashed key must be updated so that it can continue to index the correct FYV.

As described above, the runtime data contained in the reference framework can include a plurality of storage entities that use the FYV, and each of those storage entities contains at least a keystring that contains the FYV identifier. For each such keystring, a corresponding hashed key can be generated by using a hash function. Any number of suitable hash algorithms can be used, and hash collisions can be addressed accordingly. The hash algorithm can be applied to generate the hashed key from the keystring.

Because the keystring is altered after changing the FYV identifier, the corresponding hashed key must be regenerated after replacing the old FYI identifier with the new FYI identifier in the keystring. Such update of the hashed key thus ensures that it continues to map to the correct FYV despite the change of the FYV identifier in the reference framework.

For illustration purposes, the two tables below respectively show selected runtime data before and after changing five FYV identifiers. In these tables, each keystring contains the predefined parameter name "I_PERIV" followed by a FYV identifier (e.g., "K4" or "SZ"). Each keystring is indexed by a generated hashed key. In addition, each keystring is also identified by a variant ID, which is machine generated and uniquely linked to the corresponding keystring (i.e., even if the FYV identifier is renumbered, the variant ID remains the same such that it always points to the same object).

| Entity name | Hashed key | KeyString | Variant |
|---|---|---|---|
| Runtime Data Before Changing FYV Identifier | | | |
| OA84_T090Z_J48_01.TXT | 0809FE72F55709A1B4E82002DFB05A8F6B9FE0E6 | §I_BDATJ=0000§I_BUMON=08§I_BUTAG=01§I_PERBSL=A5§I_PERIV=K4 | TUI8JzRFC4PFayk1fv5WzeXSHvo= |

| Entity name | Hashed key | KeyString | Variant |
|---|---|---|---|
| OA84_T090Z_J48_01.TXT | B9A44BDC700249E4D1E1B323BDB75347CE34568E | §I_BDATJ=0000§I_BUMON=12§I_BUTAG=31§I_PERBSL=A6§I_PERIV=K4 | r39sEIQuh2EY3HA9IzDrGLeS8cs= |
| OA84_T090Z_J48_01.TXT | 05709E3185F2441B843B25CE4CE8A8833B9358EC | §I_BDATJ=0000§I_BUMON=03§I_BUTAG=31§I_PERBSL=A7§I_PERIV=K4 | nIVfkV7s9yJRRLCrZsJ/YIFFY2g= |
| OA84_T090Z_J48_01.TXT | 9680497229B92F7608FC50172B288F1D4E8D6D98 | §I_BDATJ=0000§I_BUMON=12§I_BUTAG=31§I_PERBSL=A8§I_PERIV=K4 | 5Fg/gqAKceh7qftVnGxt/egpurM= |
| OA84_T090Z_J48_01.TXT | 2C6E770B6246A03122D4D10E037B02B558D535FD | §I_BDATJ=0000§I_BUMON=04§I_BUTAG=30§I_PERBSL=A9§I_PERIV=K4 | vdJZaK5PsBDgIELZpIjatakEv8k= |
| Runtime Data After Changing FYV Identifier | | | |
| OA84_T090Z_J48_01.TXT | 80C2719B767F7EFE9301EC2DA7EFF7C17412B0E9 | §I_BDATJ=0000§I_BUMON=08§I_BUTAG=01§I_PERBSL=A5§I_PERIV=SZ | TUI8JzRFC4PFayk1fv5WzeXSHvo= |
| OA84_T090Z_J48_01.TXT | 06C8D3FD57CB1323DB71460667FC895541E51DC3 | §I_BDATJ=0000§I_BUMON=12§I_BUTAG=31§I_PERBSL=A6§I_PERIV=SZ | r39sEIQuh2EY3HA9IzDrGLeS8cs= |
| OA84_T090Z_J48_01.TXT | 8B05EBBE67345E4AD49CEBBAB7F63C7AFA4FC72F | §I_BDATJ=0000§I_BUMON=03§I_BUTAG=31§I_PERBSL=A7§I_PERIV=SZ | nIVfkV7s9yJRRLCrZsJ/YIFFY2g= |
| OA84_T090Z_J48_01.TXT | 923BA92DE5D63C5C5D20FD4BDDF859D5D8EF894D | §I_BDATJ=0000§I_BUMON=12§I_BUTAG=31§I_PERBSL=A8§I_PERIV=SZ | 5Fg/gqAKceh7qftVnGxt/egpurM= |
| OA84_T090Z_J48_01.TXT | 5E8A4467FCE7DCCCF980275FA77FACD2162E232E | §I_BDATJ=0000§I_BUMON=04§I_BUTAG=30§I_PERBSL=A9§I_PERIV=SZ | vdJZaK5PsBDgIELZpIjatakEv8k= |

As shown, after replacing the old FYV identifiers "K4" with new FYV identifiers "SZ" in the keystrings, the corresponding hashed keys are also updated. The variant ID that is unique to the corresponding entity remains unchanged.

Figure 11:
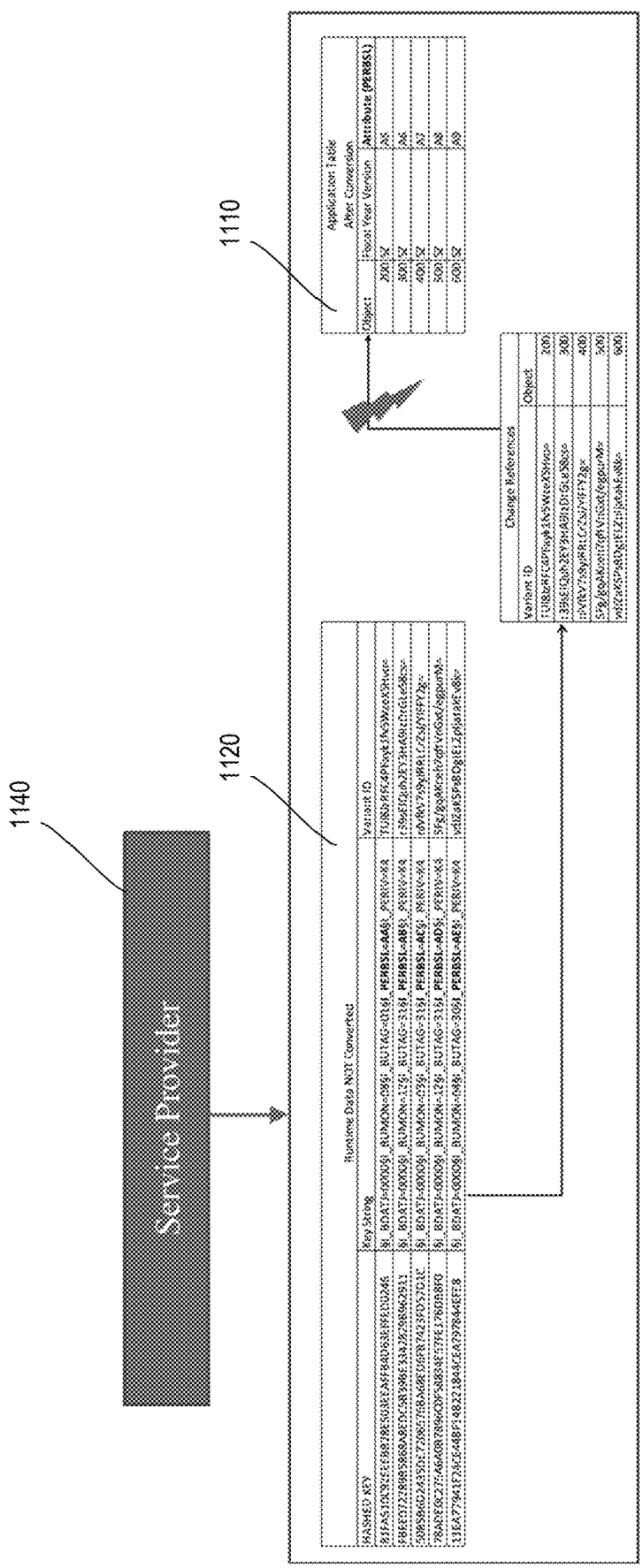
FIG. 11 is a diagram illustrating a use case where the fiscal year variant is updated in the backend tables but not in the reference framework, resulting in a broken link between the reference framework and the backend tables.

As noted above, for cloud-based ERP system, it is important to convert FYV in both backend tables and the reference framework. As examples, FIG. 11 illustrates a use case where the FYV is updated in the backend tables 1110 but not in the reference framework 1120, resulting in a broken link between the reference framework 1120 and the backend tables 1110. As shown, the FYV in the backend tables 1110 have been converted to "SZ." However, the FYV in the reference framework 1120 remain unchanged as "K4." Because of such mismatch, the reference framework 1120 cannot interact properly with the backend tables 1110. As a result, if the service provider 1140 wants to introduce a new scope or feature to the cloud-based ERP system (e.g., changing the Attribute PERBLS from A5 to AA, from A6 to AB, from A7 to AC, from A8 to AD, and from A9 to AE), such changes cannot be properly implemented because the reference framework 1120 is not aware of the FYV conversion made in the backend tables 1110.

Figure 12:
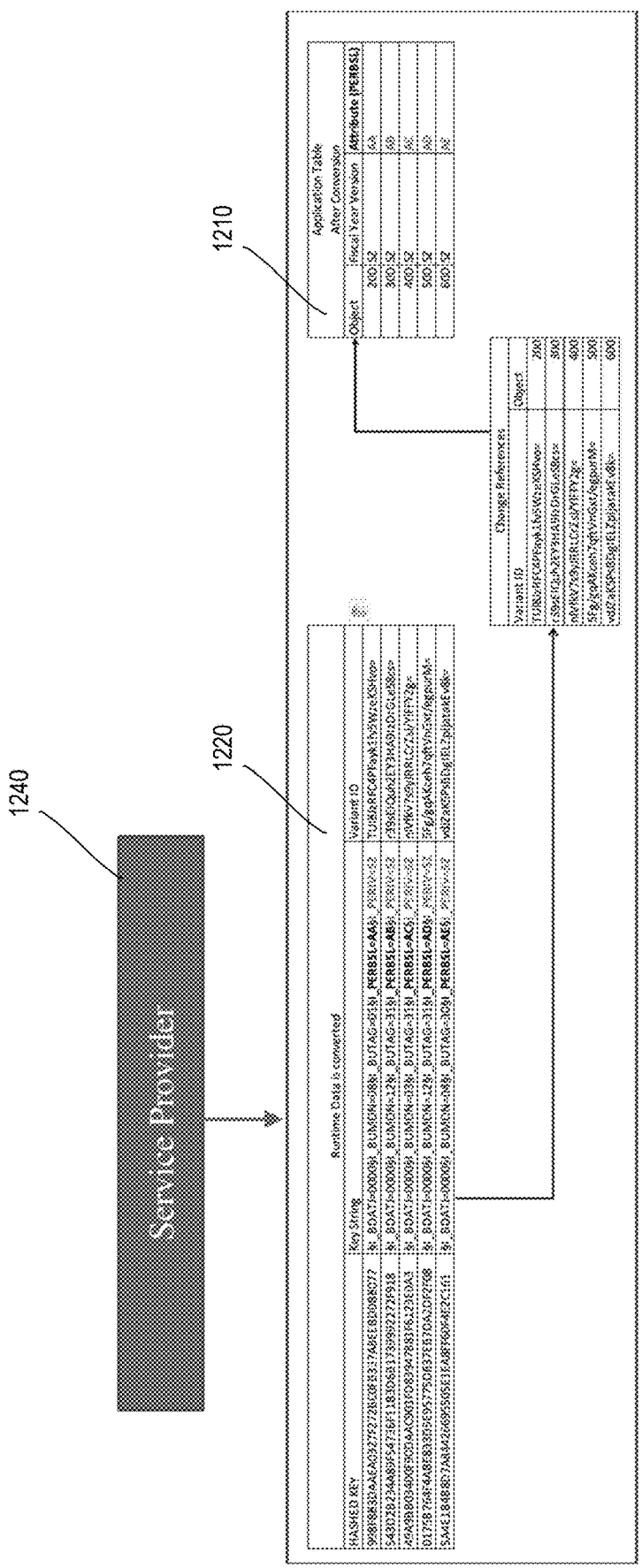
FIG. 12 is a diagram illustrating a use case where the fiscal year variant is updated in both the backend tables and the reference framework, ensuring the persistent link between the reference framework and the backend tables.

In contrast, FIG. 12 illustrates a use case where the FYV is updated in both the backend tables 1210 and the reference framework 1220, ensuring the persistent link between the reference framework 1220 and the backend tables 1210. As shown, the FYV in both the backend tables 1210 and the reference framework 1220 have been converted to "SZ." As a result, any changes pushed by the service provider 1240 can consistently reach the backend tables 1210. For example, FIG. 12 shows that the service provider 1240 successfully changes the Attribute PERBLS from A5 to AA, from A6 to AB, from A7 to AC, from A8 to AD, and from A9 to AE in the backend tables 1210. Comparing FIG. 11 with FIG. 12, it is also noted that the hashed key corresponding to each keystring is updated after replacing the old FYV identifier ("K4") with the new FYV identifier ("SZ"), whereas the corresponding variant ID for such keystring remain unchanged after the conversion, as explained above.

Example 10—Example Shortened Fiscal Year

In some embodiments, the start date of the old FYV and the start date of the new FYV are the same. The method described above is adequate to handle such FYV conversion.

In other embodiments, the start dates of the old FYV and the new FYV may differ. In such circumstances, certain adjustment can be made before triggering the FYV conversion. If no adjustment is made, direct FYV conversion could result in a period that has no FYV assignment.

This can be illustrated by the following example: assuming a scenario that a customer wants to convert an old FYV configured to range from January to December to a new FYV configured to range from April to March. Further assuming that today's date is Feb. 1, 2019 and the customer wants to have a new fiscal year starting from Apr. 1, 2019 and ending Mar. 31, 2020. If no adjustment is made, direct FYV conversion could result in no FYV assignment for three months: January, February, and March, as illustrated in the following tables.

| Before Conversion | | | | | | | | | | | | | |
|---|---|---|---|---|---|---|---|---|---|---|---|---|---|
| Calendar Year: 2019 | | | | | | | | | | | Calendar Year: 2020 | | |
| Fiscal Year: 2019 | | | | | | | | | | | Fiscal Year: 2020 | | |
| JANUARY | FEBRUARY | MARCH | APRIL | MAY | JUNE | JULY | AUGUST | SEPTEMBER | OCTOBER | NOVEMBER | DECEMBER | JANUARY | FEBRUARY | MARCH |

| After Conversion (without adjustment) | | | | | | | | | | | | | |
|---|---|---|---|---|---|---|---|---|---|---|---|---|---|
| Calendar Year: 2019 | | | | | | | | | | | Calendar Year: 2020 | | |
| No FYV assignment | | | | | | Fiscal Year: 2019 | | | | | | | |
| JANUARY | FEBRUARY | MARCH | APRIL | MAY | JUNE | JULY | AUGUST | SEPTEMBER | OCTOBER | NOVEMBER | DECEMBER | JANUARY | FEBRUARY | MARCH |

According to certain embodiments, fiscal year adjustment can be made prior to the FYV conversion to properly handle such circumstances. Specifically, before triggering the FYV conversion, a shortened fiscal year (SFY) that has less than 365 days can be constructed. For example, the table below shows that a shortened fiscal year that includes only three months (January, February, and March) can be constructed.

| After Conversion (with SFY adjustment) | | | | | | | | | | | | | |
|---|---|---|---|---|---|---|---|---|---|---|---|---|---|
| Calendar Year: 2019 | | | | | | | | | | | Calendar Year: 2020 | | |
| SFY | | | | | | Fiscal Year: 2019 | | | | | | | |
| JANUARY | FEBRUARY | MARCH | APRIL | MAY | JUNE | JULY | AUGUST | SEPTEMBER | OCTOBER | NOVEMBER | DECEMBER | JANUARY | FEBRUARY | MARCH |

Example 11—Example Embodiment

In an example embodiment, changing the old FYV to the corresponding new FYV in the plurality of backend tables and the reference framework can be scheduled to occur in a period when no business transaction involving FYV is taking place (e.g., during the business downtime). This is because conversion of runtime data in the reference framework and generating the hashed keys can take some non-negligible time. Thus, such arrangement can ensure the integrity of the changes and avoid unintentional disruption of the transactions. In addition, during the scheduled period for FYV conversion, there should be no additional lifecycle activities by the service provider. Moreover, the ERP can take a snapshot of its database as a fallback mechanism in case an unexpected error occurs during the conversion.

In an example embodiment, one or more computer-readable media can have encoded thereon computer-executable instructions, which, when executed, can cause one or more processors to: in a deployed enterprise resource planning system implementing an old FYV, configure a new FYV, wherein the new FYV is different from the old FYV; identify a list of target tables in the deployed enterprise resource planning system that contains the old FYV; convert the old FYV to the new FYV in the list of target tables; and replace the old FYV with the new FYV in a reference framework interfacing with the list of target tables. The reference framework can comprise at least a storage entity. The storage entity can comprise at least a keystring. The keystring can comprise a predefined text pattern followed by an old FYV identifier representing the old FYV or a new FYV identifier representing the new FYV. The keystring can correspond to a unique identifier that remains constant after changing the old FYV identifier to the new FYV identifier.

Identifying the list of target tables can include: in a repository in the enterprise resource planning system, searching for a domain parameter that contains a predefined identifier representing the old FYV, wherein the repository comprises a schema containing a complete list of database tables and respective fields in the database tables. Replacing the old FYV to the new FYV in the reference framework can include: identifying a plurality of storage entities in the reference framework; searching for the predefined text pattern in the identified plurality of storage entities, wherein the predefined text pattern is followed by the old FYV identifier representing the old FYV; and for one or more found predefined text patterns in the identified plurality of storage entities, replacing the old FYV identifier with the new FYV identifier representing the new FYV; generating a hashed key based on the keystring that comprises the predefined text pattern and the old FYV identifier; and regenerating the hashed key after replacing the old FYV identifier with the new FYV identifier in the keystring.

Example 12—Example Advantages

A number of advantages can be achieved via the technology described herein. For example, the described technologies substantially improves the efficiency and flexibility of the cloud ERP system by allowing a client to reconfigure the cloud ERP system even after it goes live. Specifically, the described technologies allow a client to change the FYV after the cloud ERP system is deployed, without the need to discard the historical transactional data that has been accumulated by the system or re-implement the cloud ERP solution afresh with the new FYV.

Example 13—Example Computing Systems

Figure 13:
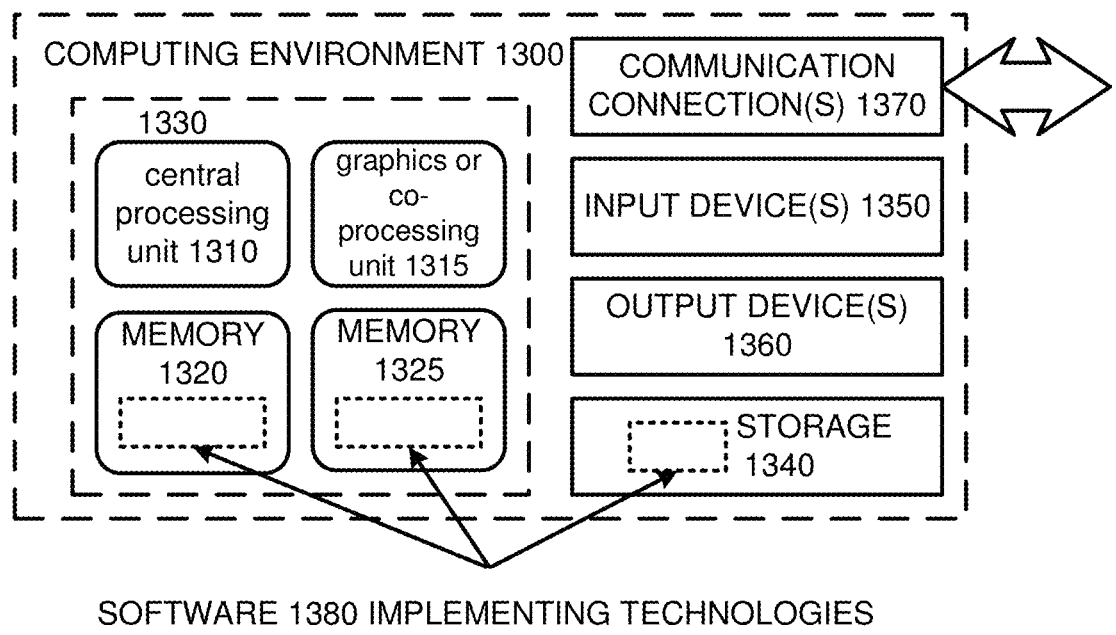
FIG. 13 is a block diagram of an example computing system in which described embodiments can be implemented.

FIG. 13 depicts an example of a suitable computing system 1300 in which the described innovations can be implemented. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 can have additional features. For example, the computing system 1300 includes storage 1340, one or more input devices 1350, one or more output devices 1360, and one or more communication connections 1370, including input devices, output devices, and communication connections for interacting with a user. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300.

The storage 1340 stores instructions for the software 1380 implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 14—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 15—Example Cloud Computing Environment

Figure 14:
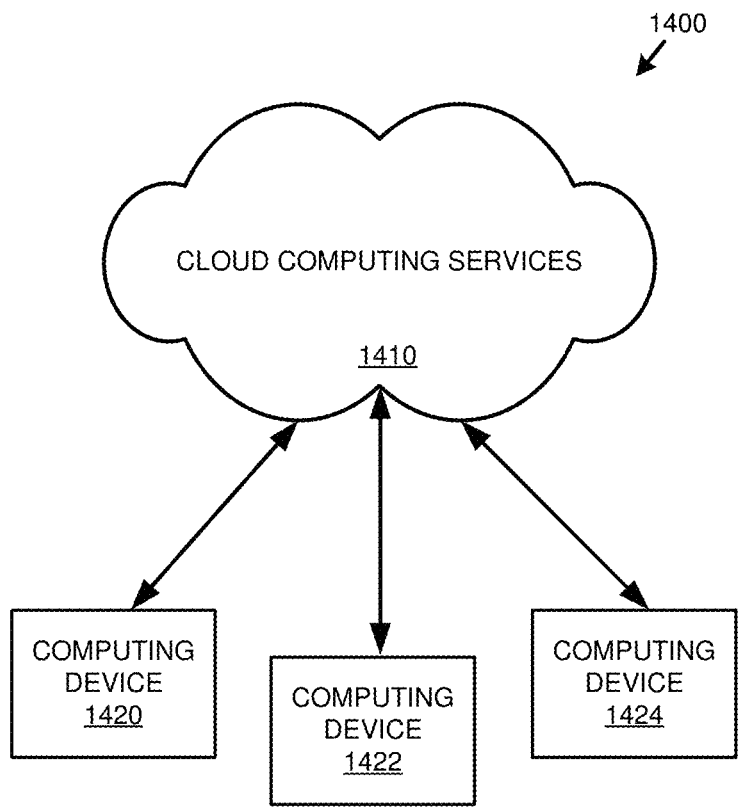
FIG. 14 is a block diagram of an example cloud computing environment that can be used in conjunction with the technologies described herein.

FIG. 14 depicts an example cloud computing environment 1400 in which the described technologies can be implemented, including, e.g., the system 200 of FIG. 2 and other systems herein. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premise-based, or hybrid scenarios can be supported.

Example 16—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 17—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method, implemented by one or more computing devices comprising at least one hardware processor and one or more tangible memories coupled to the at least one hardware processor, the method comprising:
    in a deployed cloud-based enterprise resource planning system implementing a first fiscal year variant, configuring a second fiscal year variant through a computer interface of the deployed cloud-based enterprise resource planning system, wherein the second fiscal year variant is different from the first fiscal year variant;
    identifying a list of target tables in the deployed cloud-based enterprise resource planning system that contains the first fiscal year variant;
    converting the first fiscal year variant to the second fiscal year variant in the list of target tables;
    replacing the first fiscal year variant with the second fiscal year variant in a reference framework interfacing with the list of target tables, wherein the reference framework comprises runtime data, wherein the runtime data comprises a plurality of storage entities containing references to the first fiscal year variant or the second fiscal year variant; and
    updating a hashed key after replacing the first fiscal year variant with the second fiscal year variant in the reference framework.

2. The method of claim 1, wherein the plurality of storage entities comprise respective keystrings, wherein a keystring comprises a predefined text pattern followed by a first fiscal year variant identifier representing the first fiscal year variant or a second fiscal year variant identifier representing the second fiscal year variant, and wherein the keystring corresponds to a unique identifier that remains constant after changing the first fiscal year variant identifier to the second fiscal year variant identifier.

3. The method of claim 2, wherein
    updating the hashed key comprises applying a hash function to the keystring containing the predefined text pattern followed by the second fiscal year variant identifier which replaces the first fiscal year variant identifier.

4. The method of claim 1, wherein converting the first fiscal year variant to the second fiscal year variant in the list of target tables and replacing the first fiscal year variant with the second fiscal year variant in the reference framework are scheduled to occur in a period when no business transaction involving the first fiscal year variant.

5. The method of claim 2, wherein replacing the first fiscal year variant with the second fiscal year variant in the reference framework comprises:
    identifying the plurality of storage entities in the reference framework;
    searching for the predefined text pattern in the identified plurality of storage entities that are followed by the first fiscal year variant identifier; and
    for one or more found predefined text patterns in the identified plurality of storage entities that are followed by the first fiscal year variant identifier, replacing the first fiscal year variant identifier with the second fiscal year variant identifier.

6. The method of claim 1, wherein configuring the second fiscal year variant comprises changing a start date of the first fiscal year variant to a new start date of the second fiscal year variant through the computer interface of the deployed cloud-based enterprise resource planning system.

7. The method of claim 1, wherein configuring the second fiscal year variant comprises changing a set of bookkeeping periods of the first fiscal year variant to a new set of bookkeeping periods of the second fiscal year variant through the computer interface of the deployed cloud-based enterprise resource planning system.

8. The method of claim 7, further comprising:
    responsive to changing the start date of the first fiscal year variant to the new start date of the second fiscal year variant, constructing a shortened fiscal year that has less than 365 days before converting the first year variant to the second fiscal year variant in the list of target table and replacing the first fiscal year variant with the second fiscal year variant in the reference framework.

9. The method of claim 1, wherein identifying the list of target tables comprises:
    in a repository in the deployed enterprise resource planning system, searching for a domain parameter that contains a predefined identifier representing the first fiscal year variant, wherein the repository comprises a schema containing a complete list of database tables and respective fields in the database tables.

10. The method of claim 1, wherein:
the list of target tables are located in a cloud-based backend tenant of the deployed enterprise resource planning system; and
the reference framework is configured to modify the list of target tables upon receiving an upgrade directive from a service provider, wherein the upgrade directive specifies new features or functionalities to be implemented in the deployed enterprise resource planning system.

11. A system comprising:
one or more processors; and
memory coupled to the one or more processors comprising instructions causing the one or more processors to perform operations comprising:
in a deployed cloud-based enterprise resource planning system implementing a first fiscal year variant, configuring a second fiscal year variant through a computer interface of the deployed cloud-based enterprise resource planning system, wherein the second fiscal year variant is different from the first fiscal year variant;
identifying a list of target tables in the deployed cloud-based enterprise resource planning system that contains the first fiscal year variant;
converting the first fiscal year variant to the second fiscal year variant in the list of target tables;
replacing the first fiscal year variant with the second fiscal year variant in a reference framework interfacing with the list of target tables, wherein the reference framework comprises runtime data, wherein the runtime data comprises a plurality of storage entities containing references to the first fiscal year variant or the second fiscal year variant; and
updating a hashed key after replacing the first fiscal year variant with the second fiscal year variant in the reference framework.

12. The system of claim 11, wherein the plurality of storage entities comprise respective keystrings, wherein a keystring comprises a predefined text pattern followed by a first fiscal year variant identifier representing the first fiscal year variant or a second fiscal year variant identifier representing the second fiscal year variant, and wherein the keystring corresponds to a unique identifier that remains constant after changing the first fiscal year variant identifier to the second fiscal year variant identifier.

13. The system of claim 12, wherein the operations further comprise:
identifying the plurality of storage entities in the reference framework;
searching for the predefined text pattern in the identified plurality of storage entities that are followed by the first fiscal year variant identifier; and
for one or more found predefined text patterns in the identified plurality of storage entities that are followed by the first fiscal year variant identifier, replacing the first fiscal year variant identifier with the second fiscal year variant identifier.

14. The system of claim 12, wherein
updating the hashed key comprises applying a hash function to the keystring containing the predefined text pattern followed by the second fiscal year variant identifier which replaces the first fiscal year variant identifier.

15. The system of claim 11, wherein configuring the second fiscal year variant comprises changing a start date of the first fiscal year variant to a new start date of the second fiscal year variant through the computer interface of the deployed cloud-based enterprise resource planning system.

16. The system of claim 11, wherein configuring the second fiscal year variant comprises changing a set of bookkeeping periods of the first fiscal year variant to a new set of bookkeeping periods of the second fiscal year variant through the computer interface of the deployed cloud-based enterprise resource planning system.

17. The system of claim 15, wherein the operations further comprises:
responsive to changing the start date of the first fiscal year variant to the new start date of the second fiscal year variant, constructing a shortened fiscal year that has less than 365 days before converting the first year variant to the second fiscal year variant in the list of target table and replacing the first fiscal year variant with the second fiscal year variant in the reference framework.

18. The system of claim 11, wherein identifying the list of target tables comprises:
in a repository in the deployed enterprise resource planning system, searching for a domain parameter that contains a predefined identifier representing the first fiscal year variant, wherein the repository comprises a schema containing a complete list of database tables and respective fields in the database tables.

19. The system of claim 11, wherein:
the list of target tables are located in a cloud-based backend tenant of the deployed enterprise resource planning system; and
the reference framework is configured to modify the list of target tables upon receiving an upgrade directive from a service provider, wherein the upgrade directive specifies new features or functionalities to be implemented in the deployed enterprise resource planning system.

20. One or more non-transitory computer-readable media having encoded thereon computer-executable instructions causing one or more processors to perform a method comprising:
in a deployed cloud-based enterprise resource planning system implementing a first fiscal year variant, configuring a second fiscal year variant, wherein the second fiscal year variant is different from the first fiscal year variant;
identifying a list of target tables in the deployed cloud-based enterprise resource planning system that contains the first fiscal year variant;
converting the first fiscal year variant to the second fiscal year variant in the list of target tables;
replacing the first fiscal year variant with the second fiscal year variant in a reference framework interfacing with the list of target tables, wherein the reference framework comprises runtime data, wherein the runtime data comprises a plurality of storage entities containing references to the first fiscal year variant or the second fiscal year variant; and
updating a hashed key after replacing the first fiscal year variant with the second fiscal year variant in the reference framework,
wherein the plurality of storage entities comprise respective keystrings, wherein a keystring comprises a predefined text pattern followed by a first fiscal year variant identifier representing the first fiscal year variant or a second fiscal year variant identifier representing the second fiscal year variant, and wherein the keystring corresponds to a unique identifier that remains constant after changing the first fiscal year variant identifier to the second fiscal year variant identifier;

wherein identifying the list of target tables comprises:
- in a repository in the deployed enterprise resource planning system, searching for a domain parameter that contains a predefined identifier representing the first fiscal year variant, wherein the repository comprises a schema containing a complete list of database tables and respective fields in the database tables;

wherein replacing the first fiscal year variant with the second fiscal year variant in the reference framework comprises:
- identifying the plurality of storage entities in the reference framework;
- searching for the predefined text pattern in the identified plurality of storage entities that are followed by the first fiscal year variant identifier representing; and
- for one or more found predefined text patterns in the identified plurality of storage entities that are followed by the first fiscal year variant identifier, replacing the first fiscal year variant identifier with the second fiscal year variant identifier;

wherein updating the hashed key comprises applying a hash function to the keystring containing the predefined text pattern followed by the second fiscal year variant identifier which replaces the first fiscal year variant identifier.

* * * * *